United States Patent
Simmonds et al.

(10) Patent No.: US 10,444,431 B2
(45) Date of Patent: Oct. 15, 2019

(54) RETICULATED RESONATOR, PROCESS FOR MAKING AND USE OF SAME

(71) Applicants: NATIONAL INSTITUTE OF STANDARDS AND TECHNOLOGY, Gaithersburg, MD (US); Cindy Regal, Boulder, CO (US); Pen-Li Yu, West Lafayette, IN (US); Yeghishe Tsaturyan, Copenhagen (DK); Thomas P. Purdy, Boulder, CO (US); Nir Shlomo Kampel, Boulder, CO (US)

(72) Inventors: Raymond W. Simmonds, Boulder, CO (US); Katarina Cicak, Boulder, CO (US); Cindy A. Regal, Boulder, CO (US); Pen-Li Yu, West Lafayette, IN (US); Yeghishe Tsaturyan, Copenhagen (DK); Thomas P. Purdy, Gaithersburg, MD (US); Nir S. Kampel, Boulder, CO (US)

(73) Assignee: NATIONAL INSTITUTE OF STANDARDS AND TECHNOLOGY, Gaithersburg, MD (US)

( * ) Notice: Subject to any disclaimer, the term of this patent is extended or adjusted under 35 U.S.C. 154(b) by 494 days.

(21) Appl. No.: 14/995,853

(22) Filed: Jan. 14, 2016

(65) Prior Publication Data
US 2016/0211828 A1 Jul. 21, 2016

Related U.S. Application Data

(60) Provisional application No. 62/103,673, filed on Jan. 15, 2015.

(51) Int. Cl.
*H01L 41/00* (2013.01)
*G02B 6/122* (2006.01)
(Continued)

(52) U.S. Cl.
CPC ............ *G02B 6/1225* (2013.01); *B82Y 20/00* (2013.01); *B82Y 30/00* (2013.01)

(58) Field of Classification Search
CPC ........ G02B 6/1225; B82Y 20/00; B82Y 30/00
(Continued)

(56) References Cited

U.S. PATENT DOCUMENTS

| 8,067,878 B1* | 11/2011 | Lu | H02N 2/185 |
|---|---|---|---|
| | | | 310/339 |
| 2012/0248460 A1* | 10/2012 | Abraham | C23C 16/01 |
| | | | 257/77 |

(Continued)

OTHER PUBLICATIONS

P.-L. Yu et al., A phononic bandgap shield for high-Q membrane microresonators, Applied Physics Letters, 2014, 023510.1-023510.4, vol. 104, AIP Publishing LLC.
(Continued)

*Primary Examiner* — Thomas Dougherty
(74) *Attorney, Agent, or Firm* — Office of Chief Counsel for National Institute of Standards and Technology

(57) ABSTRACT

A reticulated resonator includes: a reticulated substrate that includes: a substrate frame; and a phononic structure in mechanical communication with the substrate frame and including a plurality of unit members arranged in a two-dimensional array; and a membrane disposed on the reticulated substrate. A process for producing a membrane frequency includes: providing a reticulated resonator including: a substrate frame; a phononic structure including: a first link connected to the substrate frame; a plurality of unit members arranged in a two-dimensional array and connected to the first link and in mechanical communication with the substrate frame through the first link; and a second link connected to the unit members; a membrane frame connected to the second link and in mechanical communication with the unit members through the second link; and
(Continued)

a membrane disposed on the membrane and in mechanical communication with the substrate frame through the membrane frame and the unit members; subjecting the membrane to an excitation frequency; receiving, by the membrane, the excitation frequency; and producing, by the membrane, a membrane mode including a membrane frequency in response to receiving the excitation frequency.

17 Claims, 30 Drawing Sheets

(51) Int. Cl.
  *B82Y 20/00* (2011.01)
  *B82Y 30/00* (2011.01)
(58) Field of Classification Search
  USPC .......................................... 310/311–371, 800
  See application file for complete search history.

(56) References Cited

U.S. PATENT DOCUMENTS

2013/0187169 A1* 7/2013 Taylor ............... H01L 21/28506
  257/76

2015/0237423 A1* 8/2015 Bahr ....................... H04R 1/00
  381/162

OTHER PUBLICATIONS

Thiago P. Mayer Alegre et al., Quasi-two-dimensional optomechanical crystals with a complete phononic bandgap, Optics Express, Mar. 14, 2011, 5658-5663, vol. 19, No. 6.

Jasper Chan et al., Optimized optomechanical crystral cavity with acoustic radiation shield, Applied Physics Letters, 2012, 0811115.1-081115.4, vol. 101, AIP Publishing LLC.

Amir H. Safavi-Naeini et al., Design of optomechanical cavities and waveguides on a simultaneous bandgap phononic-photonic crystal slab, Optics Express, Jul. 5, 2010, 14926-14943, vol. 18, No. 14.

Yeghishe Tsaturyan et al., Demonstration of suppressed phonon tunneling losses in phononic bandgap shielded membrane resonators for high-Q optomechanics, Optics Express, Mar. 24, 2014, 6810-6821, vol. 22, No. 6.

* cited by examiner at third frequency f3 at first frequency f1

RETICULATED RESONATOR, PROCESS FOR MAKING AND USE OF SAME

CROSS REFERENCE TO RELATED APPLICATIONS

This application claims the benefit of U.S. Provisional Patent Application Ser. No. 62/103673, filed Jan. 15, 2015, the disclosure of which is incorporated herein by reference in its entirety.

STATEMENT REGARDING FEDERALLY SPONSORED RESEARCH

This invention was made with United States Government support from the National Institute of Standards and Technology and support from the Defense Advanced Research Projects Agency under award numbers 11-G934, 12-G934, HR0011-10-1-0065, HR00113408, HR001146956, from the National Science Foundation under award number PHY1125844, and from the Office of Naval Research under award number N00014-11-1-0770. The Government has certain rights in the invention.

BRIEF DESCRIPTION

Disclosed is a reticulated resonator comprising: a reticulated substrate comprising: a substrate frame; and a phononic structure in mechanical communication with the substrate frame and comprising a plurality of unit cells arranged in a two-dimensional array; and a membrane disposed on the reticulated substrate.

Further disclosed is a reticulated resonator comprising: a substrate frame; a phononic structure comprising: a first link connected to the substrate frame; a plurality of unit members connected to the substrate frame through the first link and in mechanical communication with the substrate frame through the first link, the unit members arranged in a two-dimensional array; and a second link connected to the unit member; a membrane frame connected to the second link and in mechanical communication with the unit member through the second link; and a membrane disposed on the membrane frame and in mechanical communication with the substrate frame through the membrane frame and the unit member.

Disclosed also is a process for producing a membrane frequency, the process comprising: providing a reticulated resonator comprising: a substrate frame; a phononic structure comprising: a first link connected to the substrate frame; a plurality of unit members connected to the substrate frame through the first link and in mechanical communication with the substrate frame through the first link; and a second link connected to the unit members; a membrane frame connected to the second link and in mechanical communication with the unit members through the second link; and a membrane disposed on the membrane frame and in mechanical communication with the substrate frame through the membrane frame and the unit members; subjecting the membrane to an excitation frequency; receiving, by the membrane, the excitation frequency; and producing, by the membrane, a membrane mode comprising a membrane frequency in response to receiving the excitation frequency

BRIEF DESCRIPTION OF THE DRAWINGS

The patent or application file contains at least one drawing executed in color. Copies of this patent or patent application publication with color drawings will be provided by the Office upon request and payment of the necessary fee.

The following descriptions should not be considered limiting in any way. With reference to the accompanying drawings, like elements are numbered alike.

DETAILED DESCRIPTION

A detailed description of one or more embodiments is presented herein by way of exemplification and not limitation.

It has been discovered that a reticulated resonator provides isolation of mechanical motion among a membrane disposed on a phononic structure. The membrane of the reticulated resonator can oscillate independently of a motion of the phononic structure. The phononic structure provides vibrational isolation of the membrane in the reticulated resonator such that the membrane includes a membrane mode and a phononic bandgap of the phononic structure. Advantageously, phonons are selectively transmitted in the reticulated resonator by tailoring the phononic bandgap of the phononic structure, wherein a bulk modulus or mass density of unit cells of the phononic structure is controlled by a process of making the reticulated resonator. The phononic structures include a periodic variation of the material properties, e.g., elasticity or mass of material included in the unit cells. In the phononic bandgap, the unit cells of the phononic structure do not communicate phonons of a selected frequency between the membrane and a substrate frame in which the membrane is surroundingly disposed. A frequency position of the phononic bandgap can be controlled by a size or arrangement of the unit cells of the phononic structure. A frequency width of the phononic bandgap is selected by controlling physical or chemical properties of the unit cells. A physical or chemical property that is controlled includes, e.g., a ratio of a volume of unit member and link to a volume of reticular gap in a unit cell to control a frequency range of a phononic bandgap of the phononic structure.

Figure 1:
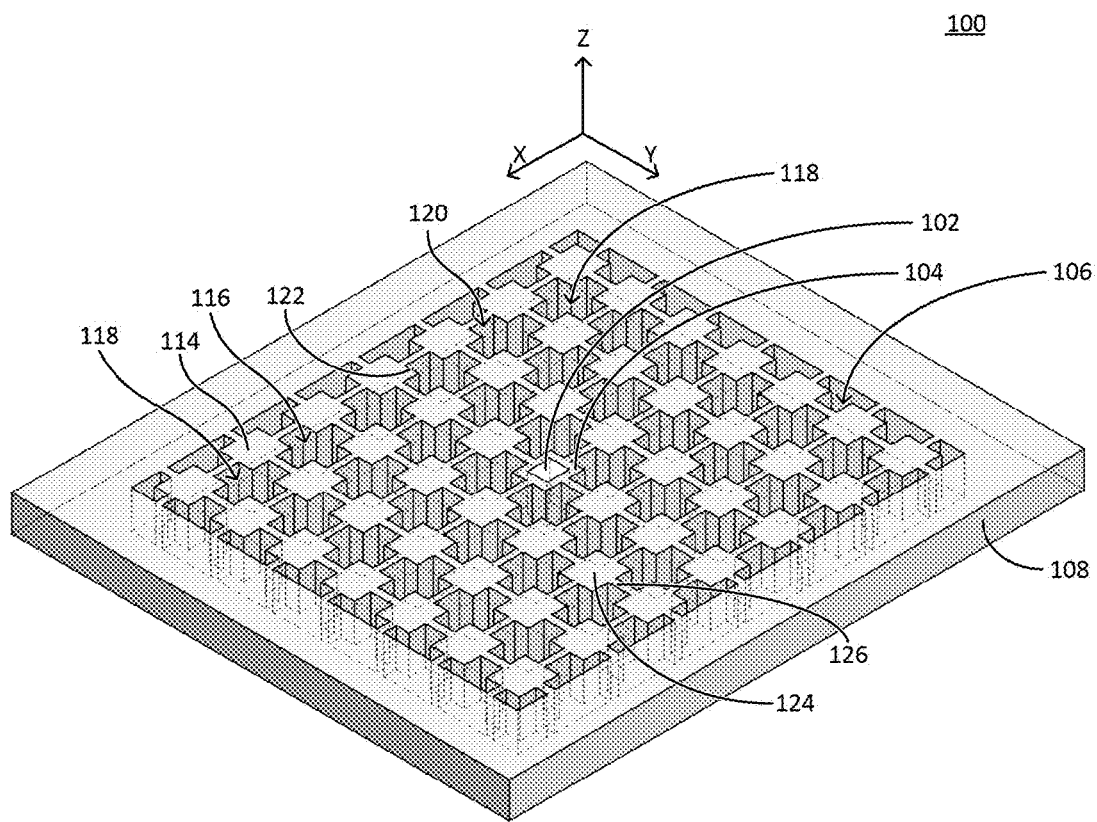
FIG. 1 shows a perspective view of a reticulated resonator.
Figure 2:
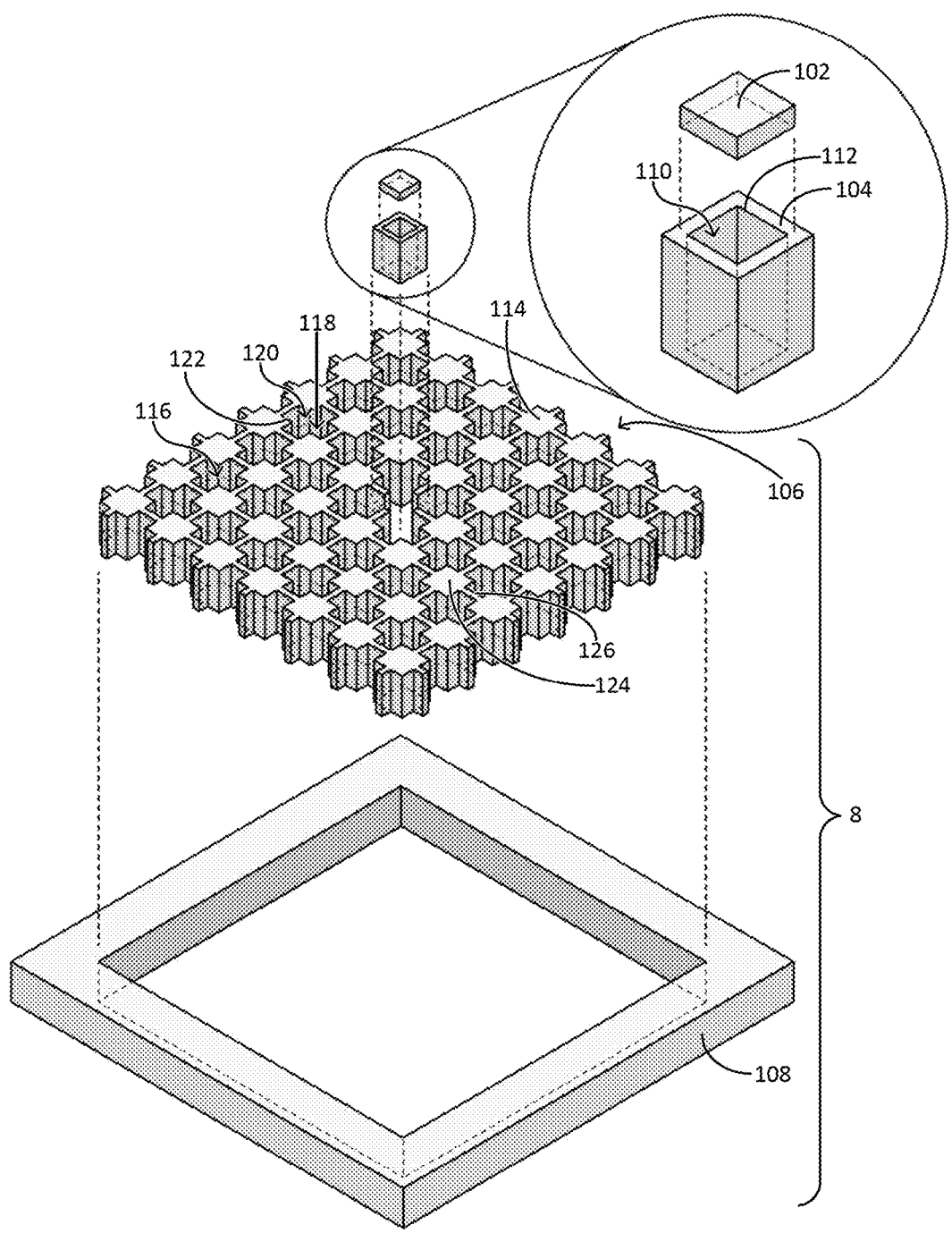
FIG. 2 shows an exploded view of the reticulated resonator shown in FIG. 1.
Figure 3:
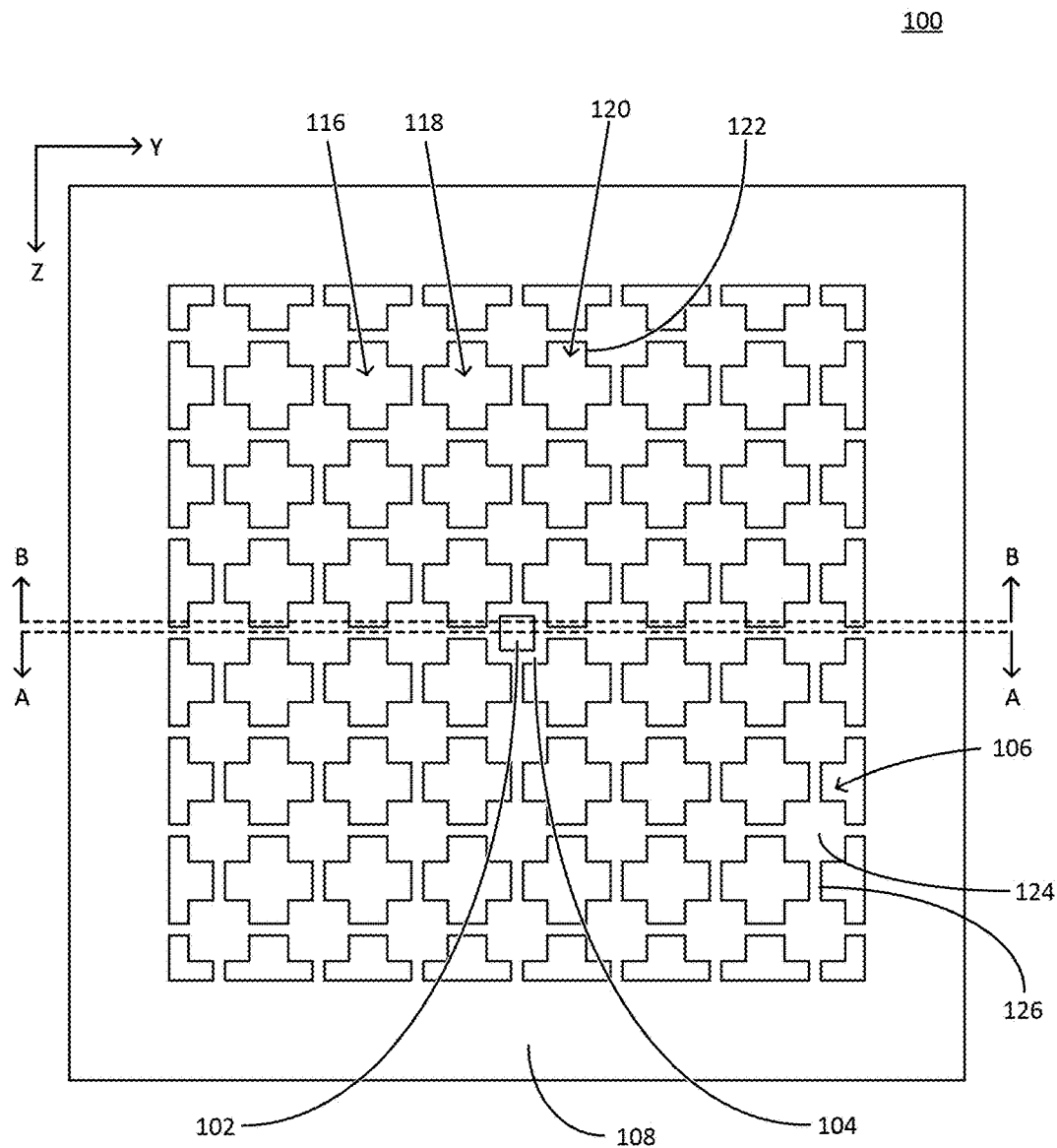
FIG. 3 shows a top view of the reticulated resonator shown in FIG. 1.
Figure 4:
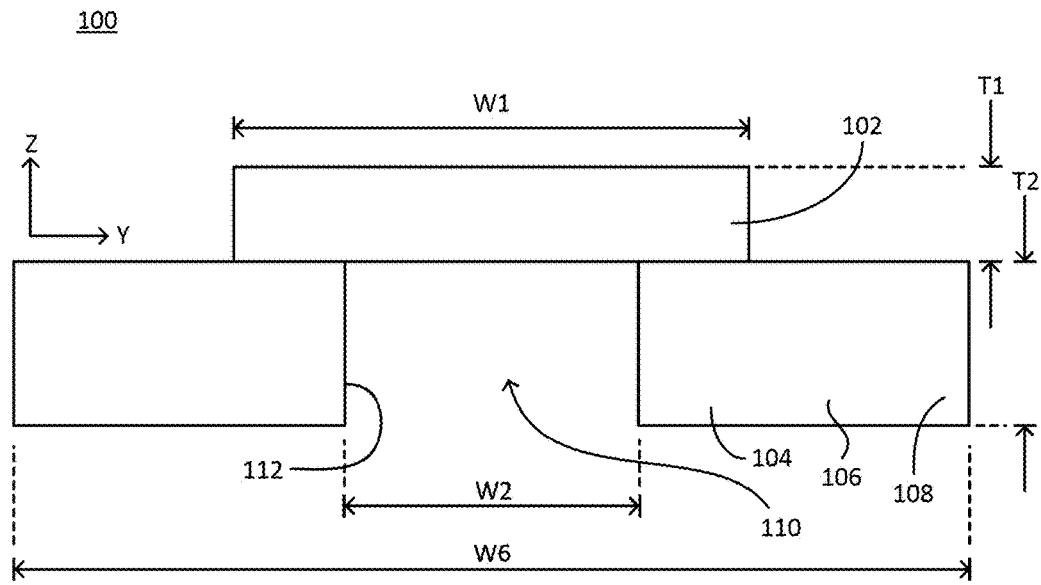
FIG. 4 along line B-B of the reticulated resonator shown in FIG. 3; shows a cross-section along line A-A of the reticulated resonator shown in FIG. 3.
Figure 5:
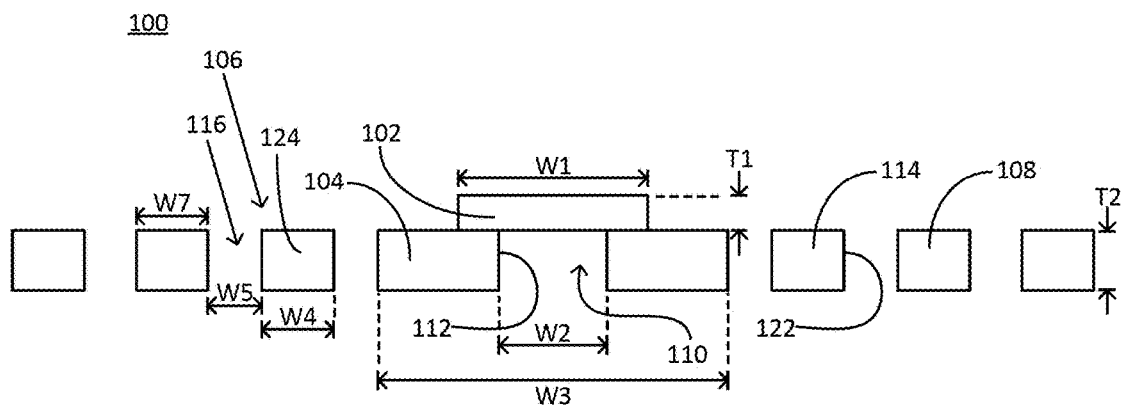
FIG. 5 shows a cross-section

In an embodiment, with reference to FIG. 1 (a perspective view of reticulated resonator 100), FIG. 2 (an exploded view of reticulated resonator 100), FIG. 3 (top view of reticulated resonator 100), FIG. 4 (cross-section along line A-A of reticulated resonator 100 shown in FIG. 3), and FIG. 5 (cross-section along line B-B of reticulated resonator 100 shown in FIG. 3), reticulated resonator 100 includes membrane 102 disposed on membrane frame 104. Membrane frame 104 is disposed in and is in mechanical communication with phononic structure 106, which is disposed in and is in mechanical communication with substrate frame 108.

In an embodiment, membrane 102 produces a membrane mode having a membrane frequency, wherein the membrane mode is produced in response to membrane 102 being subjected to a mechanical stimulus (e.g., a mechanical oscillation such as a vibration of membrane frame 104), electromagnetic stimulus (e.g., receipt of radiation such as visible light, ultraviolet light, infrared light, microwave radiation, radio waves, and the like), acoustic stimulus (e.g., receipt of acoustic waves), and the like. According to an embodiment, the membrane frequency of the membrane mode is within a frequency range of a phononic bandgap of phononic structure 106 such that phononic structure 106 substantially blocks communication of the membrane frequency from membrane 102 to membrane frame 104. Similarly, within the phononic bandgap of phononic structure 106, phononic structure 106 substantially blocks communication of frequencies between membrane frame 104 and membrane 102.

In a certain embodiment, membrane 102 produces the membrane frequency for the membrane mode that is not within the frequency range of the phononic bandgap of the phononic structure 106. Here, phononic structure 106 communicates the membrane frequency from membrane 102 to membrane frame 104.

Membrane 102 is disposed on membrane frame 104 and has a size (e.g., width W1 and thickness T1 such as shown in FIG. 4) effective to produce the membrane mode with the membrane frequency. The size (e.g., thickness T1) of membrane 102 can include a gradient such that a first portion of membrane 102 is thicker than a second portion of membrane 102. The gradient in thickness can occur monotonically or step-wise. In some embodiments, the gradient in thickness is present as a pattern such as concentric rings of different thickness material or strips of different thickness material arranged laterally across membrane 102.

A shape of membrane 102 is selected so that membrane 102 produces the membrane mode. The shape of membrane 102 provides a well-defined, high-Q mode to support the membrane frequency. Exemplary shapes of membrane 102 include round, ellipsoidal, polygonal (e.g., trigonal, square, rectangular, hexagonal, and the like), irregular (e.g., having an irregular peripheral edge that can include a curved or pointed edge), and the like. The size of membrane 102 can be selected so that membrane 102 covers a selected portion of membrane frame 104.

In an embodiment, membrane frame 104 includes aperture 110 bounded by wall 112. Membrane 102 is disposed on membrane frame 104 to cover aperture 110 on a first surface of membrane frame 104, wherein membrane 102 can cover aperture 110 completely or partially. In a particular embodiment, a filler material (not shown) optionally is disposed in aperture 110. The filler material can contact membrane 102, or membrane 102 can be spaced apart from the filler material. The filler material can affect (e.g., increase or decrease) the frequency range of the phononic bandgap or decrease a coupling of the membrane frequency between membrane 102 and phononic structure 106.

Membrane frame 104 has a size (e.g., aperture width W2, thickness T2, peripheral width W3 such as shown in FIG. 4 and FIG. 5) effective to mechanically couple with phononic structure 106. In an embodiment, membrane frame 104 and phononic structure 106 are a monolithic structure that includes electrostatic or covalent bonds between atoms or molecules of membrane frame 104 and those of phononic structure 106. In some embodiments, membrane frame 104 and phononic structure 106 are distinct structures that attach to one another directly or indirectly through a chemical bond or mechanical coupling. In a certain embodiment, an interstitial layer is interposed between membrane frame 104 and phononic structure 106 to transition between, e.g., a structure of membrane frame 104 and a structure of phononic structure 106. According to an embodiment, membrane frame 104 and phononic structure 106 are the monolithic structure that includes covalent bonds among their compositions.

A shape of aperture 110 of membrane frame 104 can be selected to match the shape of membrane 102 or can be different from the shape of membrane 102. Exemplary shapes of aperture 110 or a periphery of membrane frame 104 include round, ellipsoidal, polygonal (e.g., trigonal, square, rectangular, hexagonal, and the like), irregular (e.g., having an irregular peripheral edge that can include a curved or pointed edge), and the like. The size of membrane 102 can be selected to cover a selected portion of membrane frame 104.

It is contemplated that in some embodiments membrane frame 104 and membrane 102 can be disposed in a selected position within phononic structure 106. In an embodiment, membrane frame 104 and membrane 102 are centrally disposed among the plurality of unit cells 114 of phononic structure 106. According to an embodiment, membrane frame 104 and membrane 102 are disposed non-centrally among the plurality of unit cells 114 of phononic structure 106.

In an embodiment, phononic structure 106 includes a plurality of unit cells 114 and reticulation gaps 116. Reticulation gaps 116 are interposed between neighboring unit cells 114 or interposed between unit cell 114 and substrate frame 108. Unit cells 114 can have similar or different sizes or shapes. Reticulation gaps 116 can have similar or different sizes or shapes. The composition, size, shape, or arrangement of unit cells 114 or reticulation gaps 116 in phononic structure 106 is selected to provide phononic structure with the phononic bandgap. According to an embodiment, the frequency width of the phononic bandgap is controlled by the composition, size, shape, or arrangement of unit cells 114 or reticulation gaps 116 in phononic structure 106.

Figure 6:
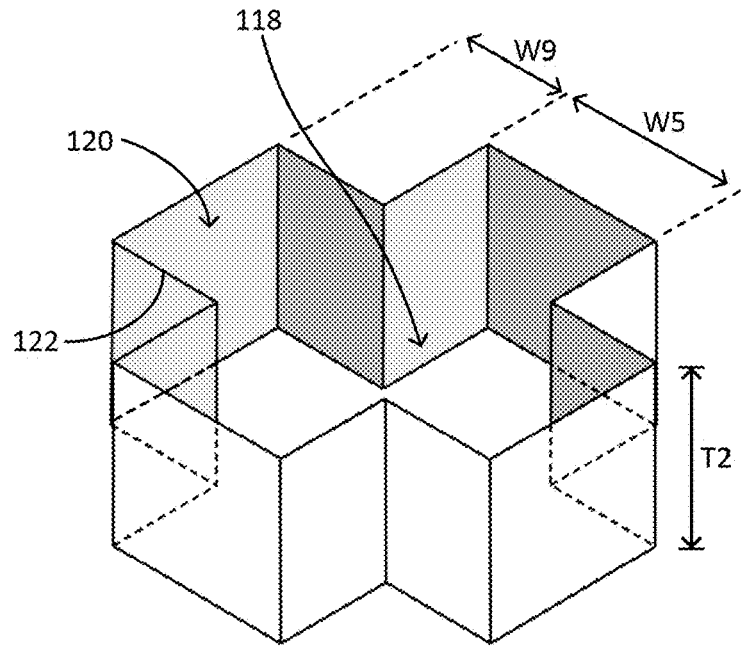
FIG. 6 shows a perspective view of the reticulation gap of the reticulated resonator shown in FIG. 1.
Figure 7:
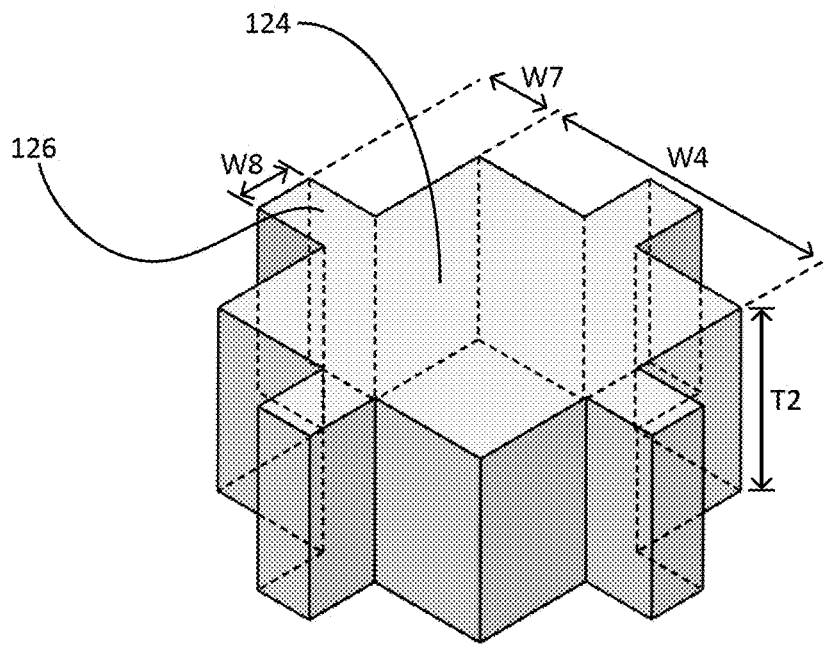
FIG. 7 shows a perspective view of the unit cell of the reticulated resonator shown in FIG. 1.
Figure 8:
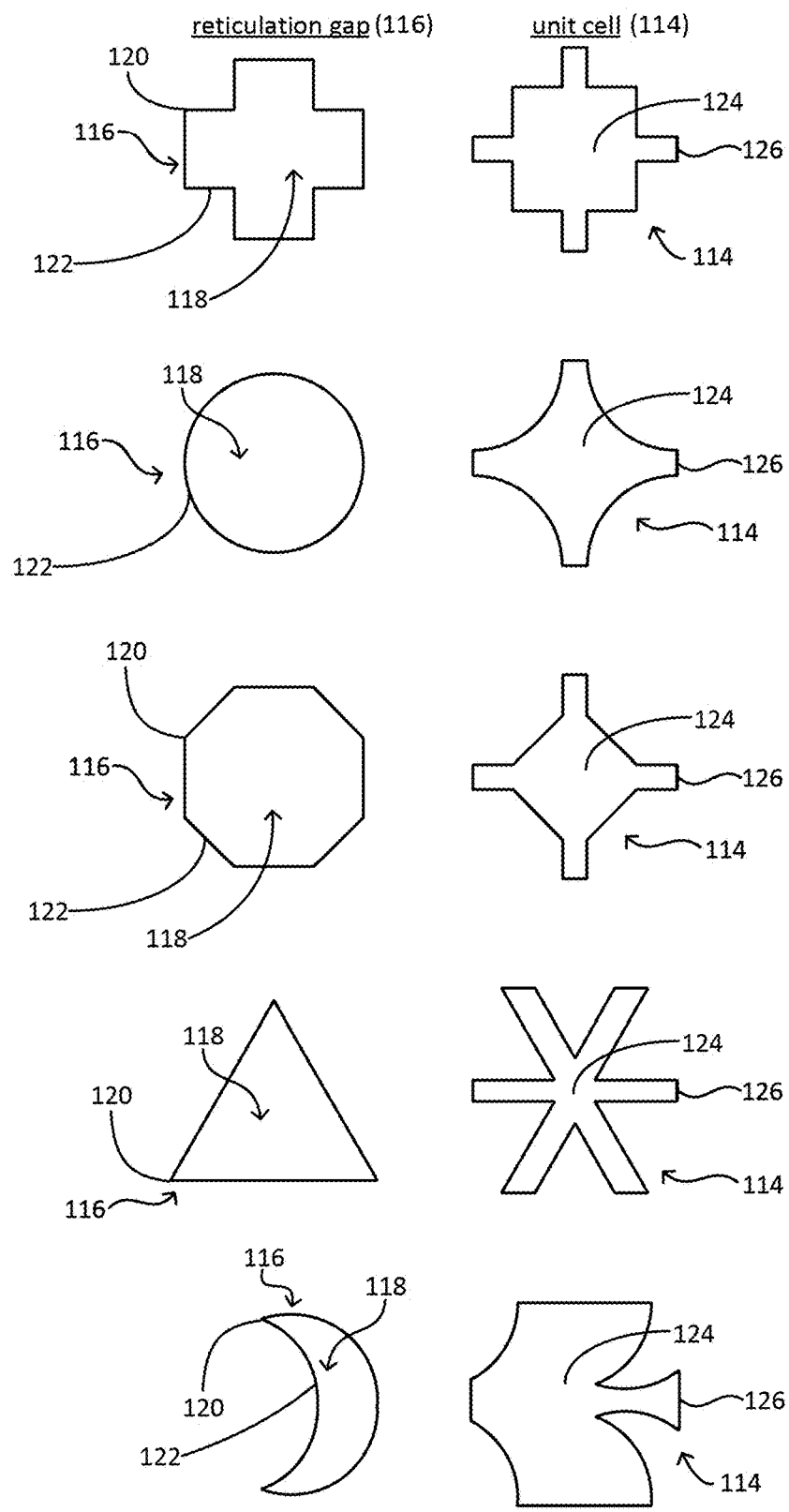
FIG. 8 shows a plurality of reticulation gaps and unit cells.

With reference, e.g., to FIG. 5, FIG. 6 (perspective view of reticulation gap 116 ), FIG. 7 (perspective view of unit cell 114 ), and FIG. 8 (top view of a plurality of reticulation gaps 116 and unit cells 116 ), reticulation cell 116 includes reticulation aperture 118 and optionally reticulation protrusion 120 bounded by wall 122. Reticulation gap 116 can have width W5 selected to provide the phononic bandgap in combination with unit cell 114. Although not limited thereto, reticulation gap 116 can have a shape as shown in FIG. 8, and exemplary corresponding shapes of unit cells 114 also are shown in FIG. 8. Exemplary shapes of reticulation gap 116, as shown in FIG. 8, include cross shape 128, round shape 130, T shape (not shown), round shape polygonal shape, irregular shape, crescent shape, and the like.

In an embodiment, unit cell 114 includes unit member 124 and link 126. In phononic structure 106, adjacent unit cells 114 adjoin and are in mechanical communication with each other through link 126. With reference to FIG. 7, unit cell 114 can include width W4 of unit member, widths W7 and W8 of link 126. Neighboring unit cells 114 are separated by reticulation gaps 116, e.g., having width W5 and width W9, wherein adjacent unit cells 114 are arranged such that unit members 124 are connected together via links 126.

Figure 15:
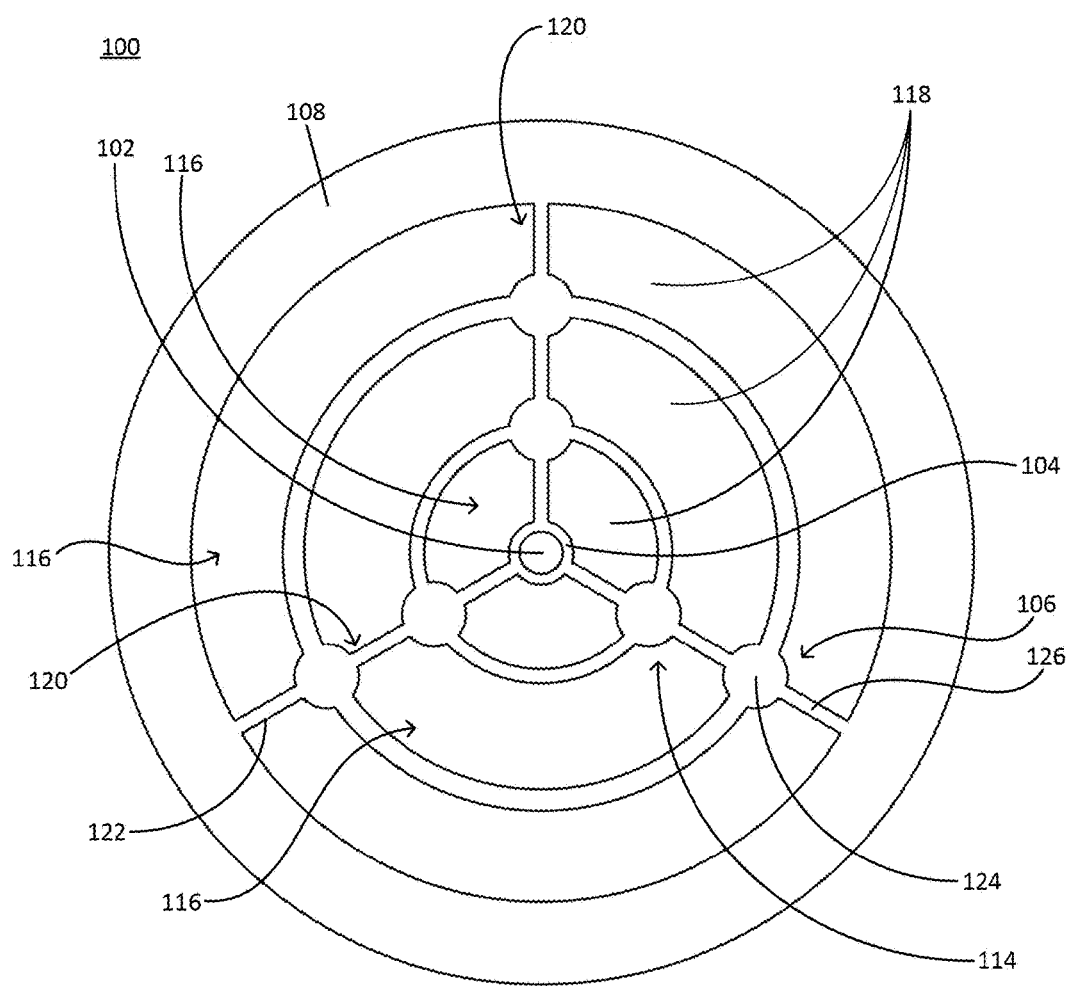
FIG. 15 shows a reticulated resonator that includes a membrane disposed on a membrane frame.

In some embodiments, reticulation gaps 116 have a same size. In a particular embodiment, reticulation gaps 116 have a plurality of sizes such that reticulated resonator 102 includes first reticulation gap 116A with a first size and a second reticulation gap 116B with a second size (as shown in FIG. 15) or a third reticulation gap 116C, wherein the first size is different from the second size. In a certain embodiment, reticulated resonator 102 includes a plurality of unit cells 114 that have different sizes.

According to an embodiment, unit cells 114 are disposed in a periodic arrangement in phononic structure 106. The periodic arrangement can include a two-dimensional array of unit cells 114, polygonal array of unit cells 114 (e.g., a square array), a concentric circular array of unit cells 114 (e.g., as shown in FIG. 15), or a combination thereof. In an embodiment, the periodic arrangement is a three-dimensional array of unit cells 114, wherein phononic structure 106 includes a plurality of two-dimensional arrays of unit cells 114 that are in a static arrangement. In the three-dimensional array of unit cells 114, unit cells 114 from one two-dimensional array can be linked to unit cells 114 in a neighboring two-dimensional array to form a three-dimensional network of unit cells 114, which can be disposed in substrate frame 108. In such a three-dimensional phononic structure 106, membrane 102 can be disposed on membrane frame 104 that is disposed among and in mechanical communication with at least one of the two dimensional arrays of unit cells 114.

In an embodiment, phononic structure 106 includes a plurality of unit cells 124 such as a first unit cell and a second unit cell. In a certain embodiment, the first unit cell has a different shape or size than the second unit cell, wherein the first unit cell is disposed in phononic structure 106 in a different orientation than the second unit cell. In a particular embodiment, the first unit cell has a different shape or size than the second unit cell, wherein the first unit cell is disposed in phononic structure 106 with a same orientation as the second unit cell. According to an embodiment, a phononic structure 106 includes a plurality of unit cells 124 that have an identical shape or size, and the first unit cell is disposed in phononic structure 106 in a different orientation than the second unit cell. In a particular embodiment, the first unit cell has a same shape or size, and the first unit cell is disposed in phononic structure 106 with a same orientation as the second unit cell.

In an embodiment, a gradient in the size, shape, or composition of unit cells 114 or reticulation gaps 116 is present in phononic structure 106. In a certain embodiment, reticulation gaps 116 have a uniform size, uniform shape, uniform composition, or combination thereof. According to an embodiment, unit cells 114 have a uniform size, uniform shape, or combination thereof. Here, "uniform" refers to the size or shape for all or substantially all such elements (e.g., unit cells 114 or reticulation gaps 116) in phononic structure 106.

According to an embodiment, link 126 connects phononic structure 106 to substrate frame 108. Substrate frame 108 has a size (e.g., width W7, thickness T2, peripheral width W3 such as shown in FIG. 5) effective to mechanically couple with phononic structure 106. In an embodiment, substrate frame 108 and phononic structure 106 are a monolithic structure that includes electrostatic or covalent bonds between atoms or molecules of substrate frame 108 and those of phononic structure 106. In some embodiments, substrate frame 108 and phononic structure 106 are distinct structures that attach to one another directly or indirectly through a chemical bond or mechanical attachment or contact. In a certain embodiment, an interstitial layer is interposed between substrate frame 108 and phononic structure 106 to transition between, e.g., a structure of substrate frame 108 and a structure of that of phononic structure 106. According to an embodiment, substrate frame 108 and phononic structure 106 are the monolithic structure that includes covalent bonds among their compositions.

A shape of substrate frame 104 can be selected to match the shape of phononic structure 106 or can be different from the shape of phononic structure 106. Exemplary shapes of substrate frame 104 include round, ellipsoidal, polygonal (e.g., trigonal, square, rectangular, hexagonal, and the like), irregular (e.g., having an irregular peripheral edge that can include a curved or pointed edge), and the like. The size of substrate frame 104 can be selected to provide a mounting surface to a mount for reticulated resonator 100.

In an embodiment, reticulated resonator 100 includes substrate frame 108; phononic structure 106 that includes first link 126 connected to substrate frame 108, unit member 124 connected to first link 126 and in mechanical communication with substrate frame 108 through first link 126, and second link 126 connected to unit member 124; membrane frame 104 connected to second link 126 and in mechanical communication with unit member 124 through second link 126; and membrane 102 disposed on membrane frame 104 and in mechanical communication with substrate frame 108 through membrane frame 104 and unit member 124. Reticulated resonator 100 further can include a source to produce an excitation frequency, wherein membrane 102 receives the excitation frequency from the source. According to an embodiment, membrane 102 is configured to produce a membrane mode in response to receiving the excitation frequency, and the membrane mode includes a membrane frequency that is in a phononic bandgap of phononic structure 106. It should be appreciated that the excitation frequency can be identical to the membrane frequency or different from the membrane frequency. Here, while the membrane frequency has a frequency value that is due to the vibration of membrane 102, the excitation frequency can be an optical frequency (e.g., at a terahertz frequency), microwave frequency (e.g., at a gigahertz frequency), radiofrequency, and the like. It should be appreciated that membrane 102 oscillates at the membrane frequency, which is a same frequency as a normal mode of membrane 102. That is, membrane 102 does not oscillate at an arbitrary frequency that is not identical to a normal mode frequency of membrane 102. In an embodiment, the excitation frequency from the source is different from a normal mode frequency of membrane 102 such that membrane 102 does not oscillate. In an embodiment, the excitation frequency from the source is different from a normal mode frequency of membrane 102 such that membrane 102 oscillates at the membrane frequency. Without wishing to be bound by theory, it is believed that when the excitation frequency is different than a normal mode frequency, membrane 102 can oscillate at the membrane frequency (which is at a normal mode frequency) due to a non-linear effect, frequency up-conversion, frequency down-conversion, or the like that couples the excitation frequency to excitation of a normal mode of membrane 102.

In an embodiment, substrate frame 108 supports phononic structure 106, membrane frame 104, and membrane 102. Size W6 or thickness of substrate frame 108 can be selected to be large enough to support these components and to mount reticulated resonator 100 on a mounting structure, e.g., a mounting structure configured to receive reticulated resonator 100. Size W6 can be a largest linear dimension of substrate frame 108 and can be from a size as large as membrane 102 to several centimeters, e.g., from 1 micrometers (μm) to 30 centimeters (cm), specifically from 1 millimeters (mm) to 5 cm, and more specifically from 2 mm to 2 cm. The thickness of substrate frame 108 can be as thick as other components of reticulated resonator 100 to several centimeters, e.g., from 100 nanometers (nm) to 10 cm, specifically from 1 μm to 1 mm, and more specifically from 100 μm to 500 m.

In an embodiment, phononic structure 106 is disposed on and in mechanical communication with substrate frame 108. A size of phononic structure 106 depends on a number of or arrangement of unit cells 114. The number of or arrangement of unit cells 11.4 in reticulated resonator 100 can be selected to selectively communicate, including to substantially decrease or to eliminate an amplitude of acoustic mode communicated, a frequency (e.g., a membrane frequency) between membrane 102 and substrate frame 108. Accordingly, the size of phononic structure 106 is selected to isolate acoustically membrane 102 from substrate frame 108 throughout the frequencies covered by the phononic bandgap. Thickness T2 of phononic structure 106 can be as thick as other components of reticulated resonator 100 to several centimeters, e.g., from 100 nm to 10 cm, specifically from 1 μm to 1 mm, and more specifically from 100 μm to 500 μm.

Phononic structure 106 includes unit cells 114 that interconnect via links 126 to form reticulation gaps 11.6 bounded by wall 122. With reference to FIG. 7, unit cell 114 has thickness T2 and includes unit member 124 (having size W4) and link 126 (having size W8 and W7). Sizes (W4, W7, W8) can be a largest linear dimension of unit cell 114 and independently can be, e.g., from 100 μm to 10 cm, specifically from 1 μm to 1 cm, and more specifically from 10 nm to 1 mm. Thickness T2 of unit cells 112 independently can be from 100 nm to 10 cm, specifically from 1 μm to 1 mm, and more specifically from 100 μm to 500 μm.

Referring to FIG. 6, reticulation gaps 116 formed by a repeated pattern of unit cells 114 includes reticulation aperture 118 (having size W5) and optionally reticulation protrusion 120 (having size W9), Sizes (W5, W9) can be a largest linear dimension of reticulation gap 116 and independently can be, e.g., from 100 nm to 10 cm, specifically from 1 μm to 1 cm, and more specifically from 10 μm to 1 mm. It is contemplated that unit cell 114 can include an aperture disposed among unit member 124.

According to an embodiment, size W1 (e.g., a largest linear dimension) and thickness T1 of membrane 102 is effective to support the membrane mode. It is contemplated, without being so limited, that size W1 of membrane 102 can be from 10 nm to 10 cm, more specifically from 1 μm to 1 cm, and further specifically from 100 μm to 1 mm. Thickness T1 of membrane 102 can be, e.g., from 20 nanometers to 1 micrometer from 1 nm to 1 cm, specifically from 10 nm to 1 mm, and more specifically from 1.0 nm to 500 nm, In an embodiment, thickness T1 of membrane 102 is less than thickness T2 of unit member 124.

Membrane 102 includes a material selected to produce the membrane mode with the membrane frequency. In an embodiment, the membrane material decreases a communication of the membrane mode between membrane 102 and substrate frame 108 or phononic structure 106. In an embodiment, the membrane material allows communication of certain membrane frequencies between membrane 102 and substrate frame 108 but decreases efficiency of communication of other frequencies between membrane 102 and substrate frame 108.

Exemplary membrane materials include a metal (e.g., aluminum, gold, and the like), semiconductor (e.g., silicon, silicon nitride, and the like), ceramic (e.g., alumina, tungsten carbide, and the like), polymer (e.g., thermoplastic with high tensile strength), composite, and the like. A filler can be included in membrane 102 to provide a physical (electrical conductivity, dielectric constant, ferromagnetism, thermal conductivity, optical transmission, and the like), chemical, or material property (e.g., tensile strength, damage threshold, and the like). Exemplary fillers include nanoparticles (e.g., nanowire or nanotubes such as carbon nanotubes, graphene, and the like), metal (e.g., metal flakes and the like), polymer (e.g., polymer strands), and the like.

According to an embodiment, membrane 102 includes a semiconductor. An exemplary semiconductor includes an element from group 11, 12, 13, 14, 15, or 16 (IUPAC nomenclature, which respectively is identical to group I, II, III, IV, V, or VI) of the periodic table such as a Si, Ga, Ge, As, In, Sn, Sb, Te, At, Hf, Zn, and the like, or a combination thereof. According to an embodiment, the semiconductor includes a compound semiconductor such as SiC, SiGe, GaN; a group 13-15 (also referred to as a group III-V) semiconductor such as AlSb, AlAs, Aln, AlP, BN, GaSb, GaAs, GaN, GaP, InSb, InAs, InN, InP, and the like; a group 12-16 (group II-VI) semiconductor such as CdSe, CdS, CdTe, ZnO, ZnSe, ZnS, ZnTe, and the like; a group 11-17 (group I-VII) semiconductor such as CuCl and the like; a group 14-16 (group IV-VI) semiconductor such as PbS, PbTe SnS, and the like; a layer semiconductor such as $PbI_2$, $MoS_2$, GaSe, and the like; an oxide semiconductor such as CuO, $Cu_2O$, and the like; (Al, Ga)N, (Al, Ga)As, (In,Ga)As, (Al, Ga)Sb, (In,Ga)Sb, as well as nitride, arsenide, antimonide quaternary III-V alloys, or a combination therof. Examples of II-VI alloys include, but are not limited to CdSe, CdTe, CdS, ZnSe, and combinations thereof. Examples of Group III-V ternary alloys include, but are not limited to, (Ga,Al)As, (In,Ga)As, and combinations thereof. Exemplary Group III-V quaternary alloys include (Ga,In)(As,P), (In,Al, Ga)Sb, and the like. Exemplary Group III-nitride alloys include (Ga,Al)N, (Ga,In)N, (Al, In)N, (Ga, Al,In)N, and combinations thereof. Quaternary alloys of the above may also be employed.

The semiconductor also can include a supplemental element such as C, H, N, Li, Na, K, Mg, Ca, Sr, Ba, Bi, B, Al, P, S, O, and the like in an amount typically less than an amount of the semiconductor. In an embodiment, the semiconductor includes silicon, and the silicon is optionally doped. According to an embodiment, the semiconductor is an intrinsic semiconductor or an extrinsic semiconductor doped with a selected dopant, e.g., a p-dop ant or an n-dop ant. In one embodiment, the semiconductor includes a p-dopant. In another embodiment, the semiconductor includes an n-dopant. In a particular embodiment, the semiconductor is p-doped Si. In one embodiment, the semiconductor is n-doped Si. The semiconductor can be produced from, e.g., commercially available semiconductor grade p-doped Si having a particular crystalline orientation, e.g., having Miller indices <111>, <100>, and the like. The semiconductor can be amorphous, polycrystalline, or a single crystal. In an embodiment, the semiconductor has a stacked structure that includes a plurality of semiconductor layers such as by forming films as SiGe/Si/SiGe/Si on the Si semiconductor. In some embodiments, the semiconductor includes crystalline domains among amorphous material.

Membrane 102 can include an oxide such as an oxide of the semiconductor (also referred to herein as a semiconductor oxide). Other materials for the oxide include gallium oxide ($GaO_3$), aluminum oxide ($Al_2O_3$), or alloys thereof, oxides of compounds from Groups III and V or alloys thereof, and the like. Exemplary oxides also include ZnO, $HfO_2$, $SnO_2$, $In_2O_3$, $Zn_2Sn\,O_4$, $Ga_2O_3$, $Al_2O_3$, and the like. In an embodiment, membrane 102 includes a product of oxidation of a portion of the semiconductor to produce the semiconductor oxide. In some embodiments, membrane 102 includes a semiconductor oxide, a ceramic (e.g., $ZrO_2$, $Al_2O_3$, SiC, $Si_3N_4$, BN, $BaTiO_3$, and the like), a glass, or a combination comprising at least one of foregoing. In some embodiments, membrane 102 includes a nitride, carbide, or silicide or the semiconductor. In an embodiment, membrane 102 includes silicon nitride as the membrane material.

In an embodiment, membrane 102 includes a plurality of layers or a single layer of material. In the plurality of layers, a laminate structure can be present that includes alternating layers of material, wherein individual layers can have a substantially similar or different composition.

In an embodiment, membrane frame 104 includes independently an above-recited material for membrane 102 such as the metal, semiconductor, ceramic, polymer, composite, and the like. According to an embodiment, membrane frame 104 and membrane 102 include a same material. In some embodiments, membrane frame 104 and membrane 102 include a different material. In an embodiment, membrane frame 104 is a different material than membrane 102, and the membrane frame material includes silicon.

According to an embodiment, phononic structure 106 can be a material that, e.g., in combination with an arrangement of unit cells 124 or reticulation gaps 116, acoustically isolates membrane 102 from substrate frame 108. In an embodiment, phononic structure 106 includes a plurality of unit cells 124 such as a first unit cell and a second unit cell. In a certain embodiment, the first unit cell has a different material than the second unit cell. In some embodiments, the first unit cell and the second unit cell include the same material. In an embodiment, a gradient in the composition of unit cells 114 or reticulation gaps 116 is present in phononic structure 106. In a certain embodiment, unit cells 114 or reticulation gaps 116 have a uniform composition.

In an embodiment, phononic structure 106 includes material that decreases the communication of the membrane mode between membrane 102 and substrate frame 108. In an embodiment, the phononic structure material communicates certain membrane frequencies between membrane 102 and substrate frame 108 but decreases efficiency of communication of other frequencies between membrane 102 and substrate frame 108. Exemplary phononic structure materials include independently the above-recited materials for membrane 102 such as the metal, semiconductor, ceramic, polymer, composite, and the like. According to an embodiment, phononic structure 106 and membrane 102 include a same material. In some embodiments, phononic structure 106 and membrane 102 include a different material. According to an embodiment, phononic structure 106 and membrane frame 104 include a same material. In some embodiments, phononic structure 106 and membrane frame 104 include a different material. In an embodiment, phononic structure 106 and membrane frame 104 include the same material that includes silicon.

In a certain embodiment, unit member 124 is a same material as link 126. In some embodiments, unit member 124 is a different material than link 126. Moreover, an additive can be disposed in reticulated gap 116, and the additive can include independently the above-recited materials for membrane 102 such as the metal, semiconductor, ceramic, polymer, composite, and the like. In the plurality of reticulated gaps 116, a first reticulated gap can include a first additive, and a second reticulated gap can include a second additive, wherein the first additive and the second additive are the same or different material. In an embodiment, the plurality of reticulated gaps 116 are present in phononic structure 106 in an absence of additive disposed in reticulated gap 116.

In an embodiment, substrate frame 108 includes independently an above-recited material for membrane 102 such as the metal, semiconductor, ceramic, polymer, composite, and the like. According to an embodiment, substrate frame 108 and phononic structure 106 include a same material. In some embodiments, substrate frame 108 and phononic structure 106 include a different material. In an embodiment, substrate frame material includes silicon.

According to an embodiment, membrane frame 104, phononic structure 106, and substrate frame 108 is formed from a substrate, e.g., a wafer such as a semiconductor wafer. The substrate can include a material recited with regard to the membrane 102 and can be independent of the composition of membrane 102.

In a particular embodiment, reticulated resonator 100 includes membrane 102 that includes silicon nitride, which is disposed on membrane frame 104 and in mechanical communication with phononic structure 106 and substrate frame 108, wherein membrane frame 104, phononic structure 106, and substrate frame 108 include silicon. Without wishing to be bound by theory, it is believed that membrane 102 is mechanically stressed and disposed on membrane frame 104 to cover aperture 110. The stress in membrane 102 can be a tensile stress to produce a high quality factors (Q-factor) to provide the membrane frequency. The tensile stress can be, e.g., greater than 100 megapascals (MPa), specifically 900 MPa.

Figure 9:
FIG. 9 shows a plurality of structures formed during a process for making a reticulated resonator.
Figure 9:
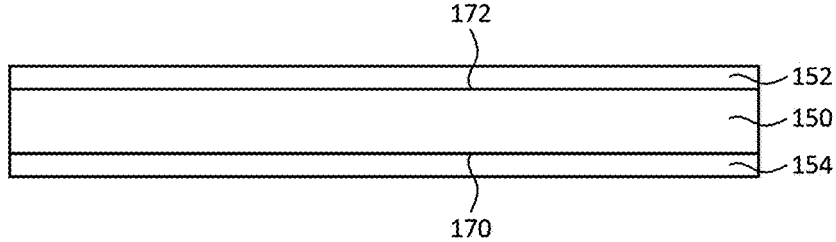
Figure 9:
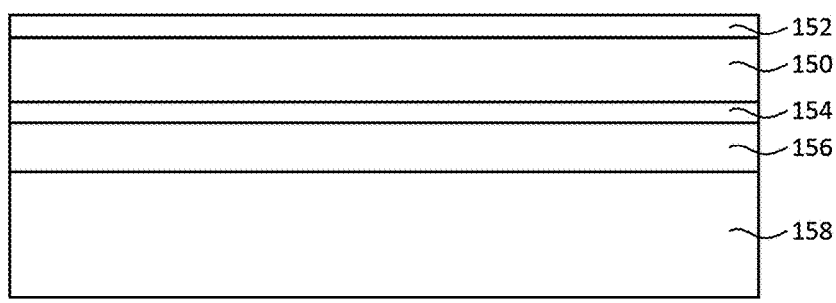
Figure 9:
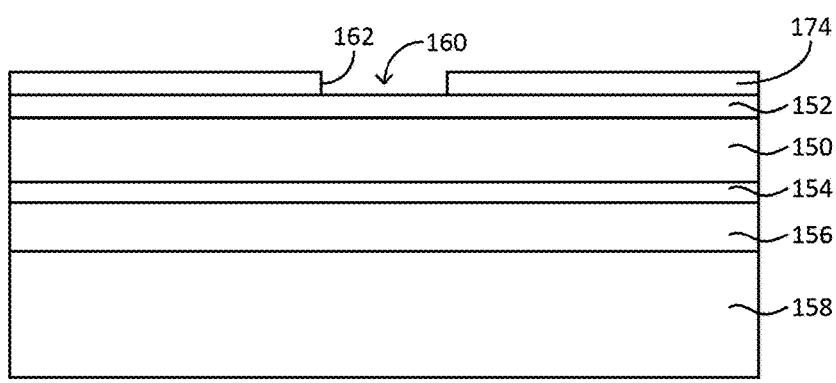
Figure 10:
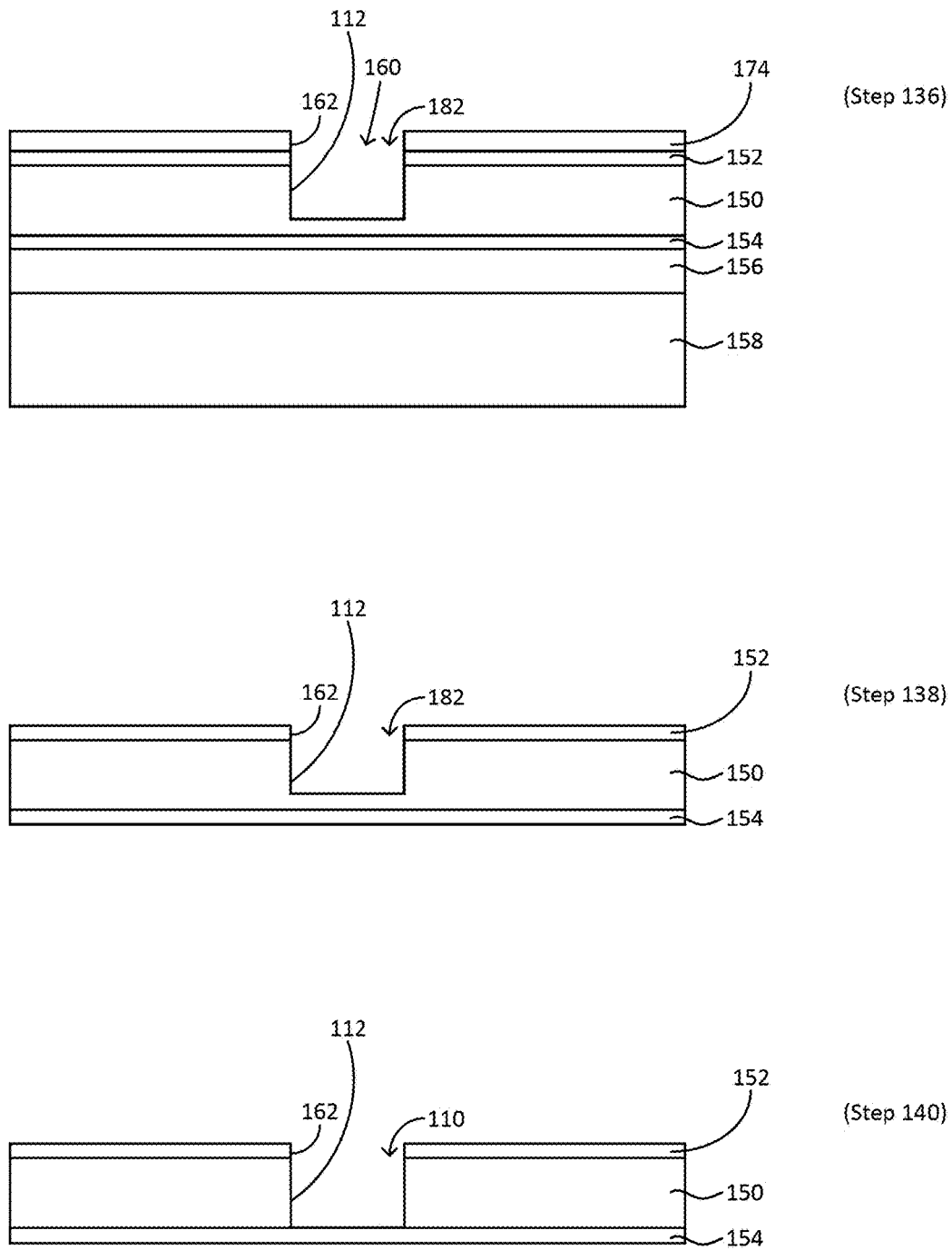
FIG. 10 shows a plurality of structures formed during a process for making a reticulated resonator.
Figure 11:
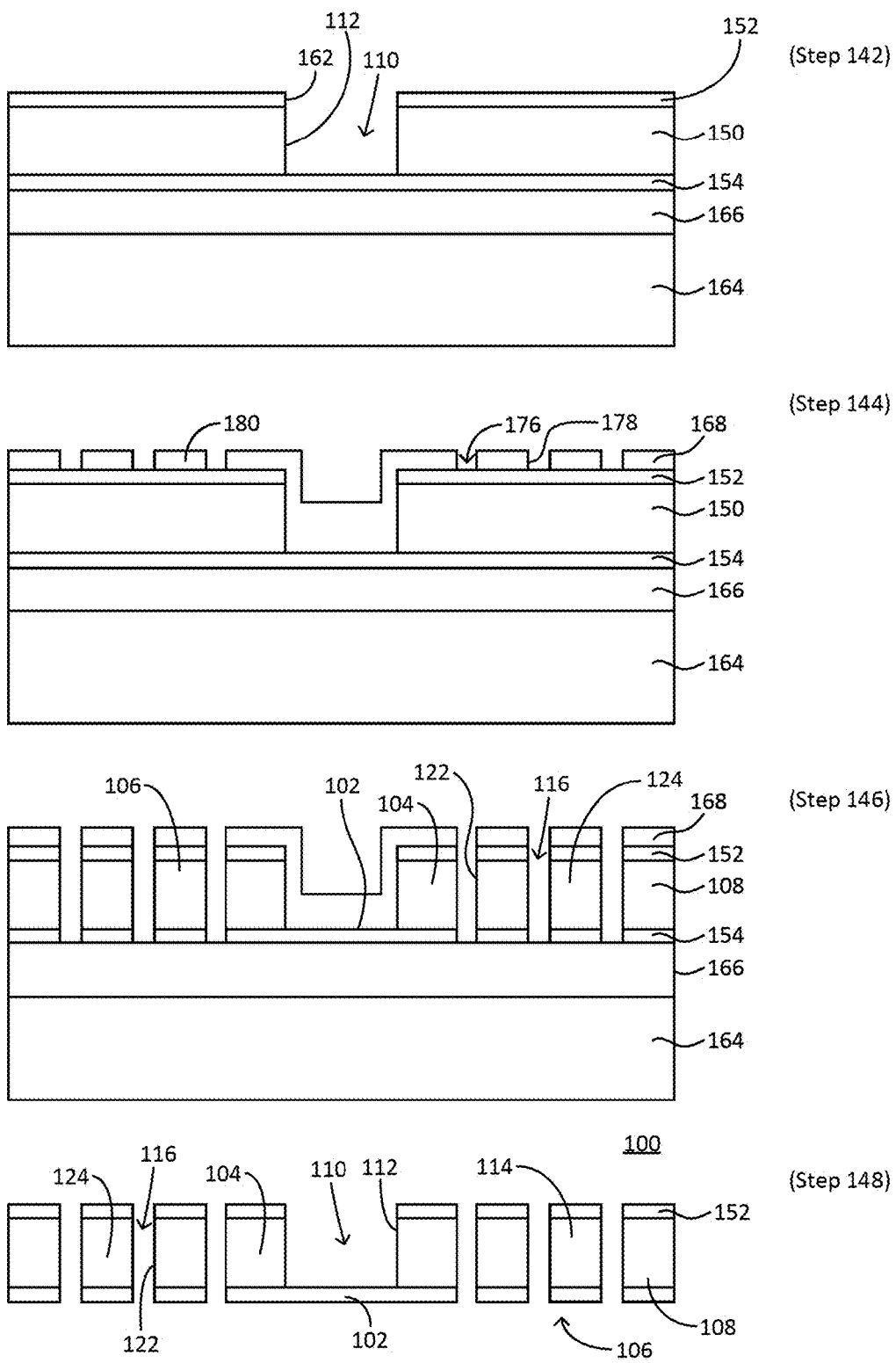
FIG. 11 shows a plurality of structures formed during a process for making a reticulated resonator.

In an embodiment, with reference to FIG. 9, FIG. 10, and FIG. 11, a process for making reticulated resonator 100 includes providing substrate 150 (step 128); disposing first film 154 and second thin film 152 respectively on first surface 170 and second surface 172 of substrate 150 (step 130); disposing protection mask 158 on substrate 150 with adhesive 156 to protect first thin film 154 (step 132); disposing exposure mask 174 on second thin form (step 134), wherein exposure mask 174 includes exposure hole 160 to expose a selected portion of second thin film 152 and bounded by wall 162; removing a portion of second thin film 152 and substrate 150 exposed through exposure hole 160 of exposure mask 174 to form intermediate aperture 182 in substrate 150 bounded by wall 112 (step 136); removing exposure mask 174, protection mask 158, and adhesive 156 from substrate 150 (step 138); removing additional material from substrate 152 form aperture 110 bounded by wall 112 (step 140); disposing protection mask 164 on substrate 150 with adhesive 166 to protect first thin film 154 (step 142); disposing exposure mask 168 on second thin film 152 and substrate 150 (step 144), exposure mask 168 including a plurality of apertures 176 bounded by wall 178 of blind pattern 180, wherein apertures 176 expose selected portions of second thin film 152; removing material at selected portions of second thin film 152, substrate 150, and first thin film 154 to form membrane 102 disposed on membrane frame 104 and surrounded by phononic structure 106 (including reticulation gap 116 bounded by wall 122 and unit member 124) and substrate frame 108 (step 146); and removing exposure mask 168 to provide aperture 110 bounded by wall 112 of membrane frame 104 and also removing protection mask 164 and adhesive 166 from membrane 102 to form reticulated resonator 100.

In an embodiment, with regard to the process for making reticulated resonator 100, substrate 150 can be a semiconductor wafer (e.g., a silicon wafer) having a thickness (e.g., hundreds of micrometers). Accordingly, semiconducting process techniques (e.g., lithography, etching, deposition, cleaning, and the like) can be applied to substrate 150 to form reticulated resonator 100. Here, disposing first film 154 and second thin film 152 on substrate 150 can include chemical vapor deposition of materials such as silicon nitride. Protection mask 158 can be a material to provide rigid support and protection to first thin film 154, wherein the material can include sapphire or another rigid supportive material that is inert to certain processing conditions. Adhesive 156 is effective to adhere protection mask 158 to first thin film 154 and can be an adhesive such as wax, resin, or glue, and the like. Exposure mask 174 can be a resist that withstands plasma and deep reactive ion etching to during formation of intermediate aperture 182. Removing exposure mask 174, protection mask 158, and adhesive 156 and additional material from substrate 152 to form aperture 110 and membrane 102 can be accomplished by, e.g., cleaning with solvents and etching with an etchant, e.g., potassium hydroxide. Protection mask 164 can be a material with respect to similar to protection mask 158 to provide rigid support and protection to first thin film 154 and to phononic structure 106. Adhesive 166 can be a material with respect to similar to adhesive 156 and is effective to adhere protection mask 164 to first thin film 154. Exposure mask 168 can be a resist with respect to similar to exposure mask 174 and forming aperture 176 by removing material from second thin film 152, substrate 150, and first thin film 154 to form reticulation gap 116 that can be accomplished by plasma processing and etching. Additionally, removing exposure mask 168, protection mask 164, and adhesive 166 from membrane 102 to form reticulated resonator 100 can be accomplished with chemical processing and cleaning of the exposed features (e.g., membrane 102 and the like).

A geometrical configuration of blind pattern 180 and arrangement of apertures 176 in exposure mask 174 provide removal of material, e.g., from thin film (154, 152) and substrate 150 to provide a selectively tailored size, shape, or number of membrane 102, membrane frame 104, phononic structure 106, substrate frame 108, aperture 110, wall 112, unit cells 114, reticulation gap 116, reticulation aperture 118, reticulation protrusion 120, wall 122, unit member 124, or link 126.

In an embodiment, reticulated resonator 100 is subjected to a stimulus. In response to the stimulus, membrane 102 or substrate frame 108 oscillates respectively at a membrane frequency or substrate frequency. According to an embodiment, the stimulus is a mechanical stimulus having an excitation frequency, wherein the mechanical stimulus can be a vibration of reticulated resonator 100. Here, the mechanical stimulus can be applied to substrate frame 108 such that substrate frame 108 produces the substrate frequency. If the substrate frequency is within a frequency of the phononic bandgap of phononic structure 106, phononic structure 106 acoustically isolates membrane 102 from substrate frame 108 and does not communicate the substrate frequency to membrane 102 from substrate frame 108. If the substrate frequency is not a frequency within the phononic bandgap of phononic structure 106, phononic structure 106 acoustically couples membrane 102 to substrate frame 108 and communicates the substrate frequency to membrane 102 from substrate frame 108. In response to receiving the substrate frequency from phononic structure 106, membrane 102 oscillates at the membrane frequency, e.g., for a membrane mode.

According to an embodiment, the stimulus is an electromagnetic stimulus (e.g., optical radiation, microwave radiation, and the like) or a mechanical stimulus (e.g. acoustic radiation) having an excitation frequency (e.g., the frequency of the radiation). Here, the stimulus can be applied to membrane 102. In response to receiving the stimulus at the excitation frequency, membrane 102 produces the membrane frequency and can produce a membrane mode. If the membrane frequency is within a frequency of the phononic bandgap of phononic structure 106, phononic structure 106 acoustically isolates membrane 102 from substrate frame 108 and does not communicate the membrane frequency from membrane 102 to substrate frame 108. If the membrane frequency is not a frequency within the phononic bandgap of phononic structure 106, phononic structure 106 acoustically couples membrane 102 to substrate frame 108 and communicates the membrane frequency from membrane 102 to substrate frame 108. Moreover, if the membrane frequency is within the phononic bandgap of phononic structure 106, the membrane frequency or membrane mode is present in membrane 102 in an absence of a frequency from substrate frame 108 due to acoustical isolation of membrane 102 and substrate frame 108 at frequencies within the phononic bandgap of phononic structure 106. In this manner, the membrane frequency and membrane mode is produced substantially noise free without interference from substrate frame 108 and noise pickup by substrate frame 108 from the mounting device in which reticulated resonator 100 is disposed. In an embodiment, membrane 102 is disposed in an electromagnetic cavity (e.g., an optical cavity, microwave cavity, and the like), wherein the excitation frequency can be coupled to a membrane frequency of membrane 102 to produce the membrane mode.

Figure 12:
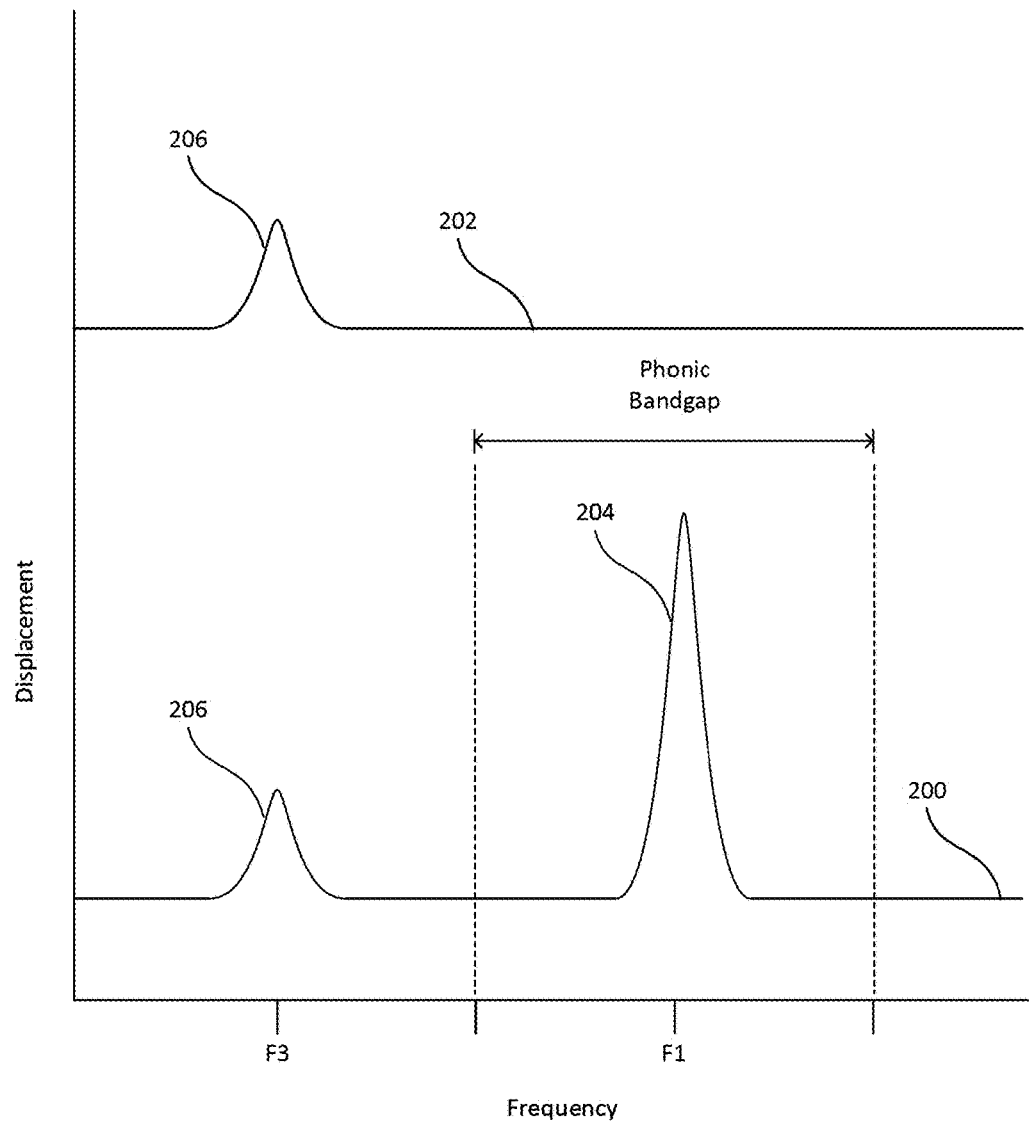
FIG. 12 shows a graph of displacement versus frequency for a reticulated resonator.
Figure 13:
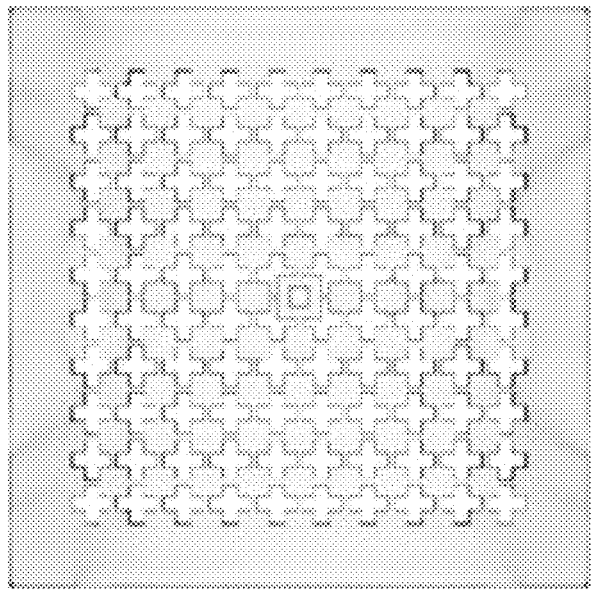
FIG. 13 shows a color map of displacement amplitude superimposed on a reticulated resonator subjected to a third frequency.
Figure 13:
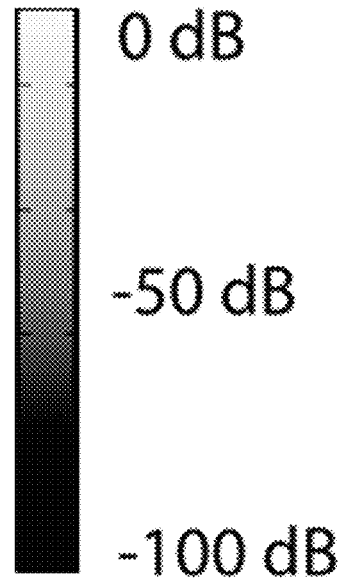
Figure 14:
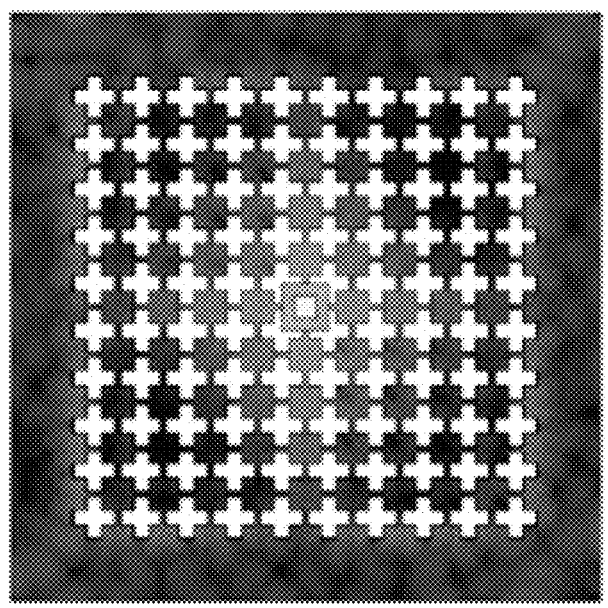
FIG. 14 shows a color map of displacement amplitude superimposed on a reticulated resonator subjected to a first frequency.
Figure 14:
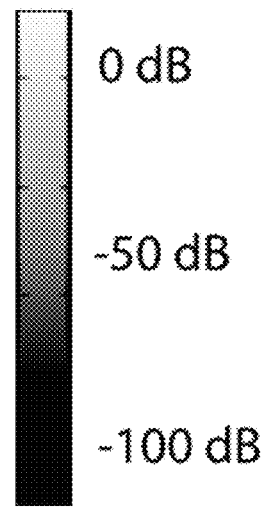

FIG. 12 shows a graph of displacement versus frequency for reticulated resonator 100 in which membrane 102 is subjected to a stimulus (e.g., the electromagnetic or mechanical stimulus), wherein membrane displacement curve 200 is offset from substrate frame displacement curve 202. Membrane displacement curve 200 shows an amplitude of displacement of membrane 102 at various frequencies, and substrate frame displacement curve 202 shows an amplitude of displacement of substrate frame 108 at various frequencies. Here, while subjected to a stimulus, membrane 102 produces first peak 204 for a first membrane mode having first membrane frequency f1 that is within the phononic bandgap of phononic structure 106, and substrate frame 108 does not receive the first frequency f1 because phononic structure 106 acoustically isolates membrane 102 and substrate frame 108. While subjected to a stimulus, membrane 102 produces a third membrane mode having third membrane frequency f3 that is not within the phononic bandgap of phononic structure 106, and substrate frame 108 receives the third frequency f3 and produces second peak 206 because phononic structure 106 acoustically couples membrane 102 and substrate frame 108 and communicates third frequency f3 between membrane 102 and substrate frame 108. FIG. 13 shows a color map of the displacement amplitude of reticulated resonator superimposed on reticulated resonator 100 when membrane 102 is subjected to third frequency f3. Here, membrane 102 has greatest displacement, and substrate frame 108 also experiences displacement. FIG. 14 shows a color map of the displacement amplitude of reticulated resonator 100 superimposed on reticulated resonator 100 when membrane 102 is subjected to first frequency f1. Here, membrane 102 has greatest displacement, and substrate frame 108 experiences little displacement.

Reticulated resonator 100 can have various sizes and shapes. In an embodiment, as shown in FIG. 15, reticulated resonator 100 is circular-shaped substrate frame 108, curved links 126 A, straight links 126 B, circular-shaped unit members 124, and circular shaped membrane 102 disposed on circular shaped membrane frame 104. Here, reticulation gaps (116A, 116B, 116C) can have a plurality of sizes or shapes to accommodate the arrangement of unit members 124 and links (126A, 126B).

Figure 16:
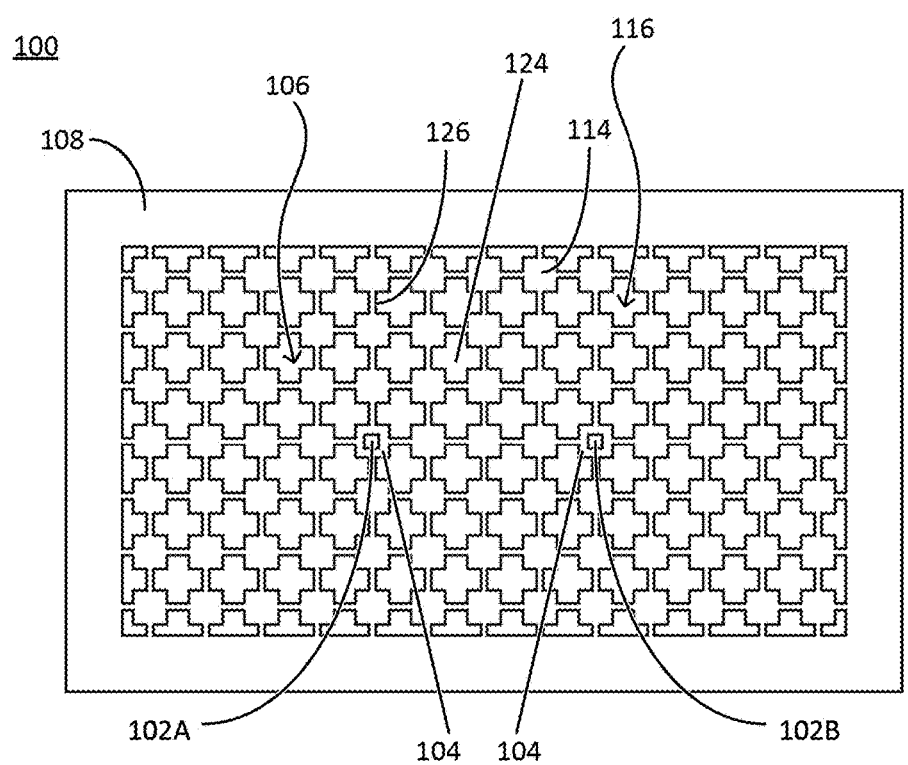
FIG. 16 shows a reticulated resonator that includes a plurality of membranes disposed independently on a plurality of membrane frames.
Figure 17:
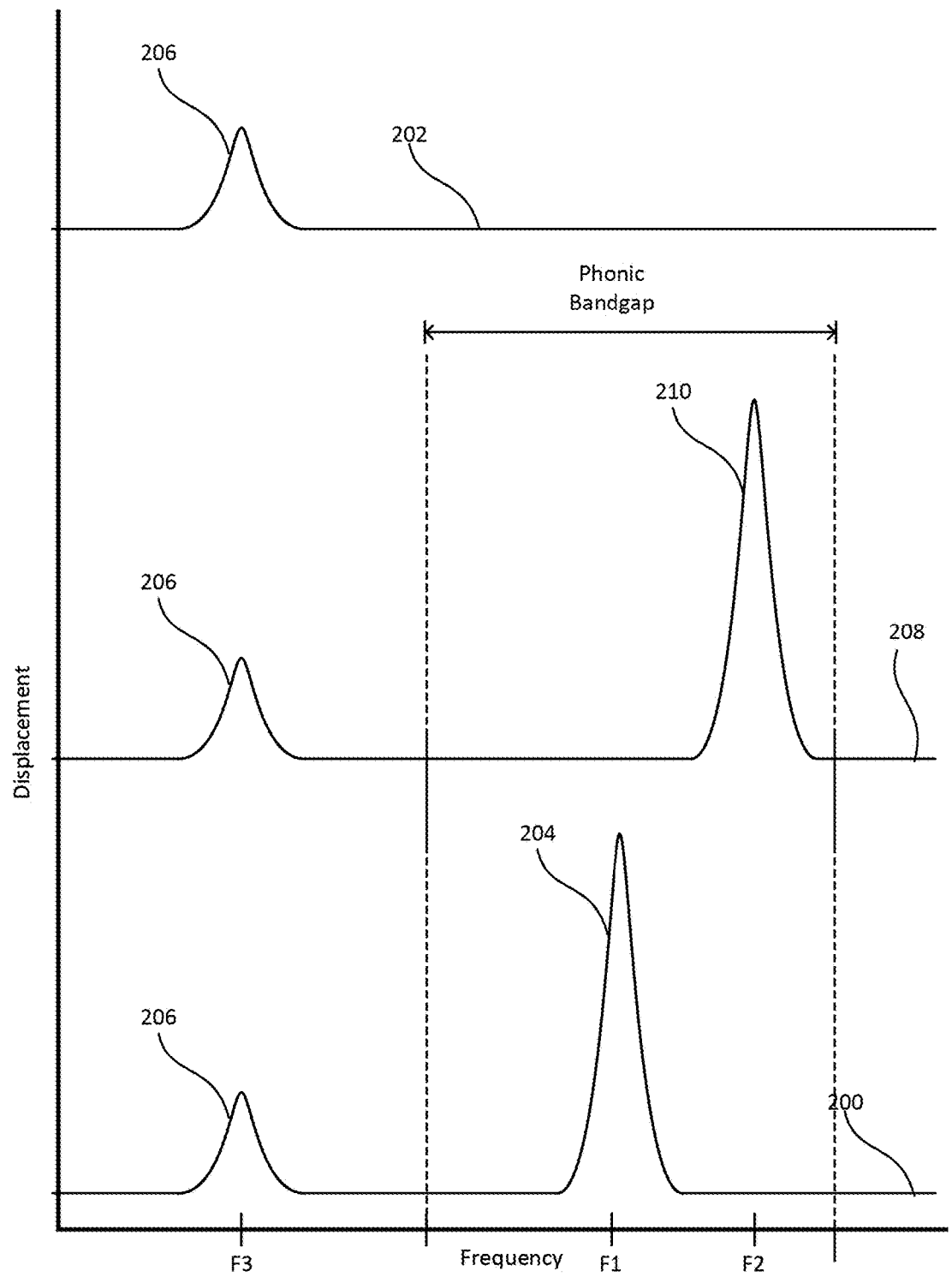
FIG. 17 shows a graph of displacement versus frequency for the reticulated resonator shown in FIG. 16.
Figure 18:
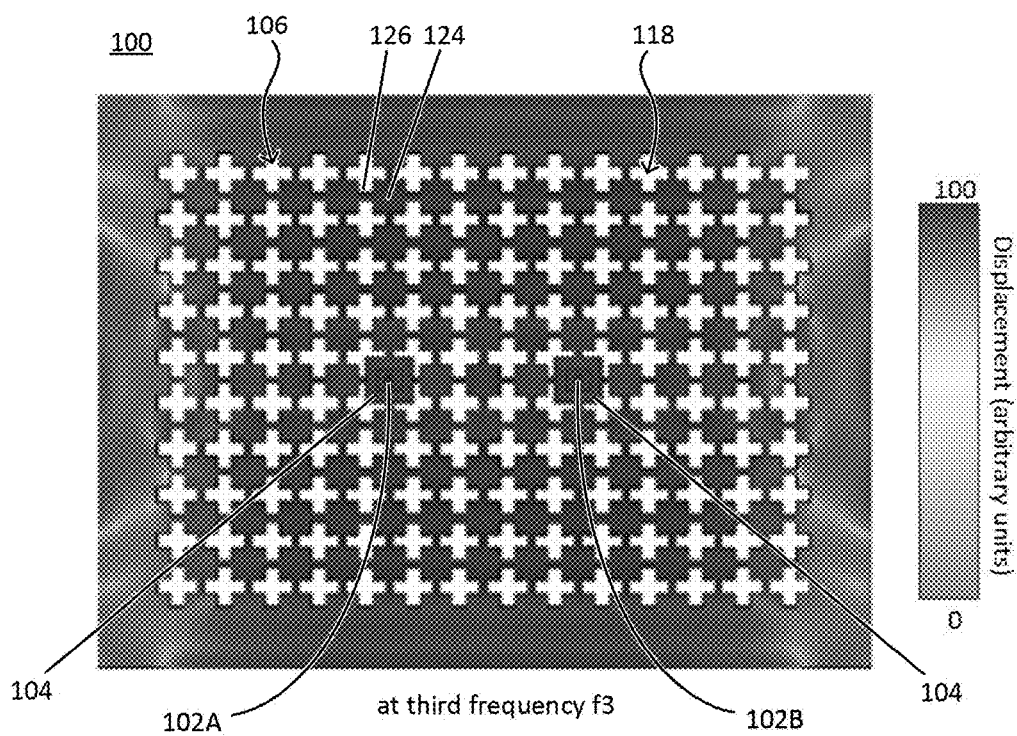
FIG. 18 shows a color map of displacement amplitude superimposed on the reticulated resonator shown in FIG. 16 that is subjected to a third frequency.
Figure 19:
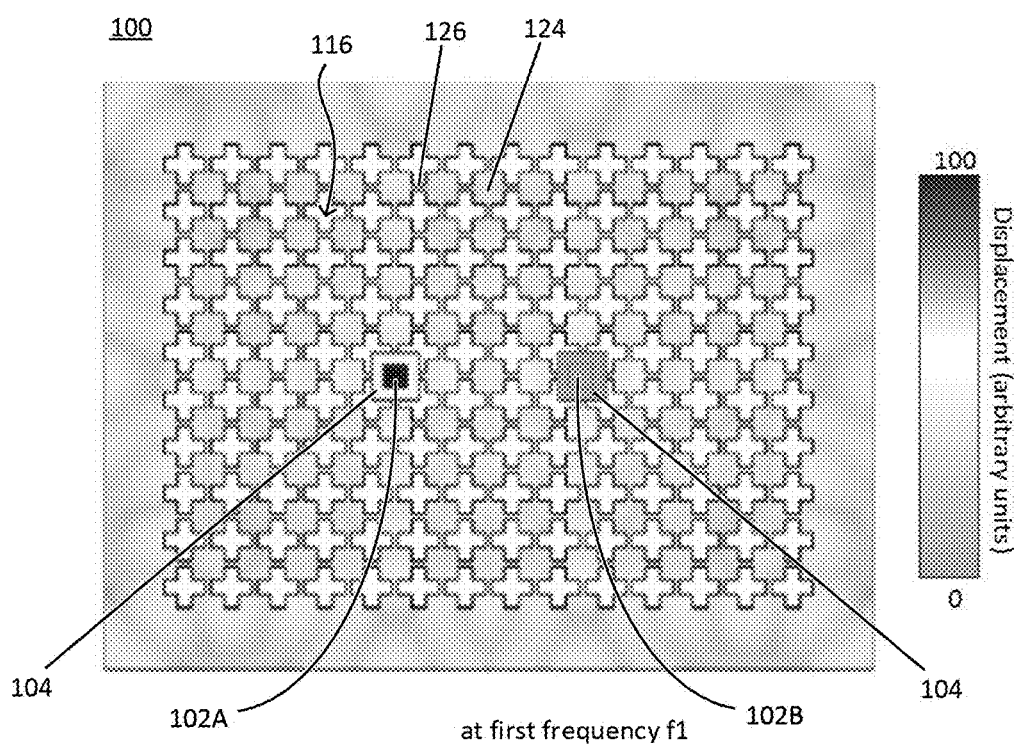
FIG. 19 shows a color map of displacement amplitude superimposed on the reticulated resonator shown in FIG. 16 that is subjected to a first frequency.
Figure 20:
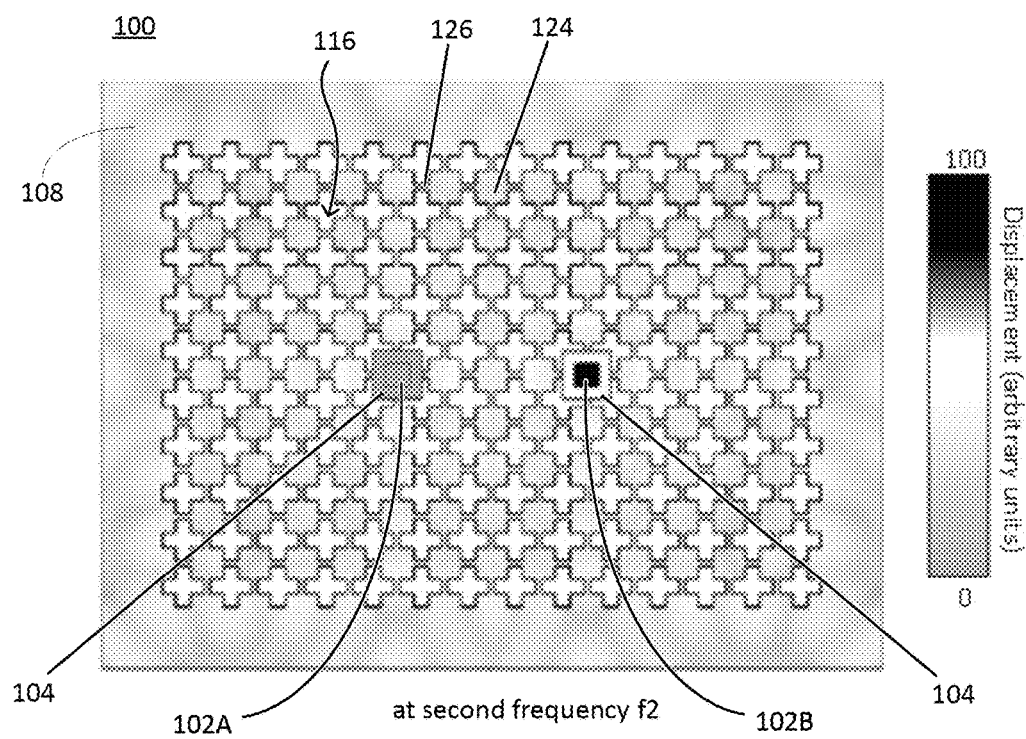
FIG. 20 shows a color map of displacement amplitude superimposed on the reticulated resonator shown in FIG. 16 that is subjected to a second frequency.

According to an embodiment, with reference to FIG. 16, reticulated resonator 100 includes a plurality of membranes (e.g., first membrane 102A and second membrane 102B) and a plurality of membrane frames (e.g., first membrane frame 104A second membrane frame 104B). First membrane 102A can include a first membrane mode at first membrane frequency f1, and second membrane 102B can include a second membrane mode at second membrane frequency f2, wherein first membrane frequency f1 can be the same or different than second membrane frequency f2. Further, it is contemplated that the first mode can be different or the same as the second mode. FIG. 17 shows a graph of displacement versus frequency for reticulated resonator 100 in which first membrane 102A and second membrane 102B are subjected to the stimulus, wherein membrane displacement curve 200, substrate frame displacement curve 202, and membrane displacement curve 208 are offset from one another. Membrane displacement curve 200 shows an amplitude of displacement of first membrane 102A at various frequencies; substrate frame displacement curve 202 shows an amplitude of displacement of substrate frame 108 at various frequencies, and membrane displacement curve 208 shows an amplitude of displacement of second membrane 102B at various frequencies. Here, at an excitation frequency of the stimulus, first membrane 102A produces first peak 204 for a first membrane mode having first membrane frequency f1 that is within the phononic bandgap of phononic structure 106, and substrate frame 108 does not receive the first frequency f1 because phononic structure 106 acoustically isolates membrane 102 and substrate frame 108. Moreover, second membrane 102B does not receive first frequency f1 because phononic structure 106 acoustically isolates first membrane 102A and second membrane 102B, and second membrane 102B is selected to not be excited by first modulation frequency f1. At an excitation frequency of the stimulus, first membrane 102A produces a third membrane mode having third membrane frequency f3 that is not within the phononic bandgap of phononic structure 106, and substrate frame 108 and second membrane 102B receive the third frequency f3 and produce second peak 206 because phononic structure 106 acoustically couples first membrane 102A, substrate frame 108, and second membrane 102B and communicates third frequency f3 between fist membrane 102, substrate frame 108, and second membrane 102B. At an excitation frequency of the stimulus, second membrane 102B produces second peak 210 for a second membrane mode that has second membrane frequency f2 that is within the phononic bandgap of phononic structure 106, and substrate frame 108 and first membrane 102A do not receive second frequency f2 because phononic structure 106 acoustically isolates first membrane 102A and substrate frame 108 from second membrane 102B and does not communicate second frequency f2 between fist membrane 102, substrate frame 108, and second membrane 102B. FIG. 18 shows a color map of the displacement amplitude superimposed on reticulated resonator 100 when first membrane 102A is subjected to third frequency f3. Here, membrane 102 has greatest displacement, and substrate frame 108 and second membrane 102B also experience displacement. FIG. 19 shows a color map of the displacement amplitude superimposed on reticulated resonator 100 when first membrane 102A is subjected to first frequency f1. Here, first membrane 102A has greatest displacement, and substrate frame 108 and second membrane 102B experience little displacement. FIG. 20 shows a color map of the displacement amplitude superimposed on reticulated resonator 100 when second membrane 102B is subjected to second frequency f2. Here, second membrane 102B has greatest displacement, and substrate frame 108 and first membrane 102A experience little displacement.

Figure 21:
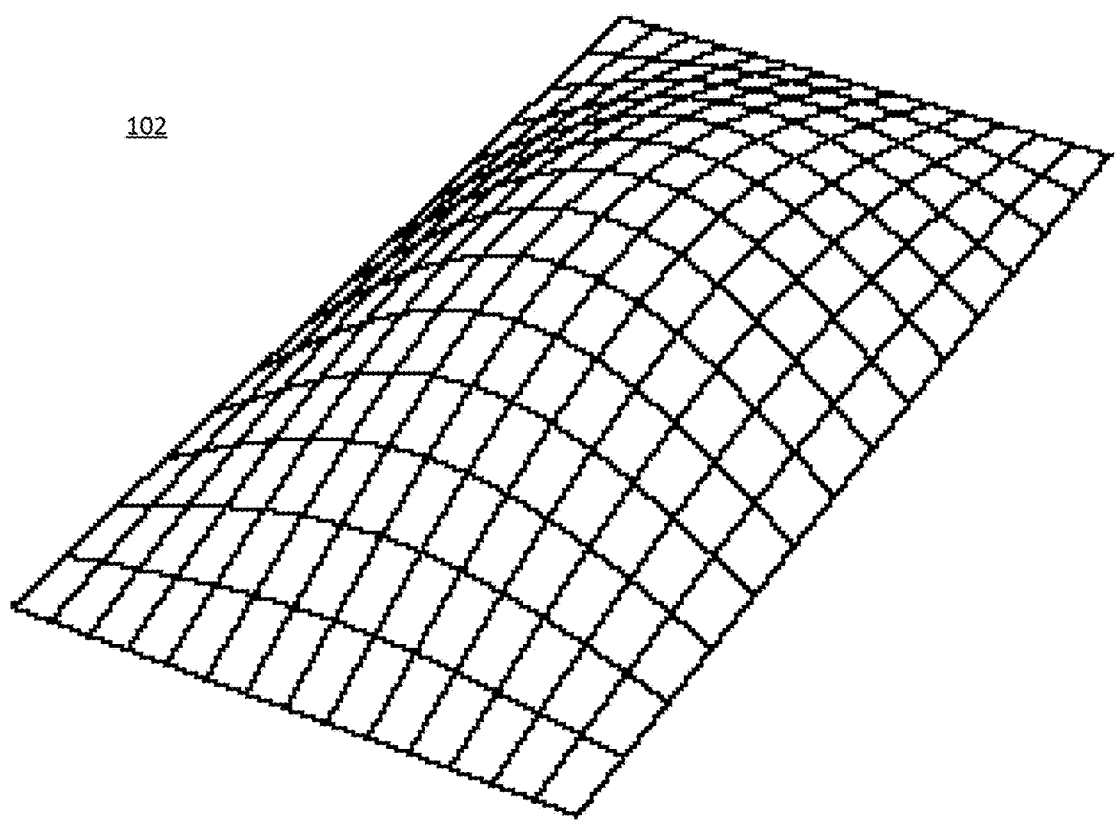
FIG. 21 shows a contour surface for displacement in a first membrane mode of a membrane.
Figure 22:
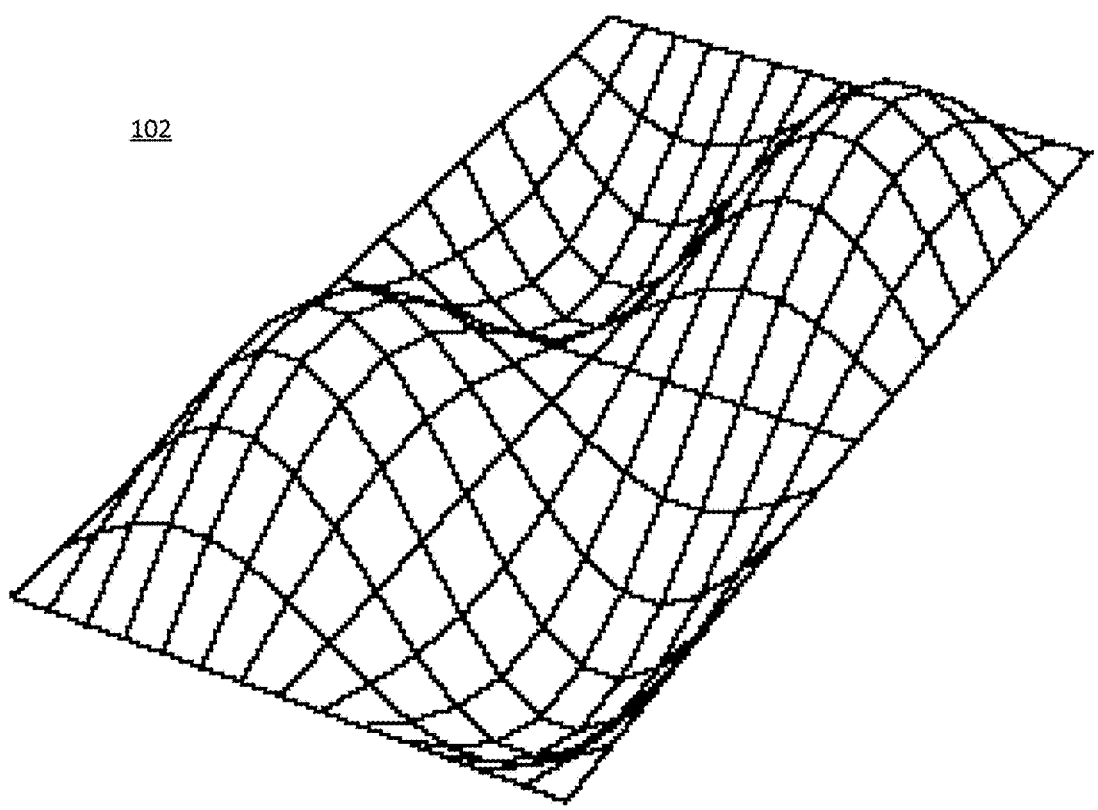
FIG. 22 shows a contour surface for displacement in a second membrane mode of a membrane.
Figure 23:
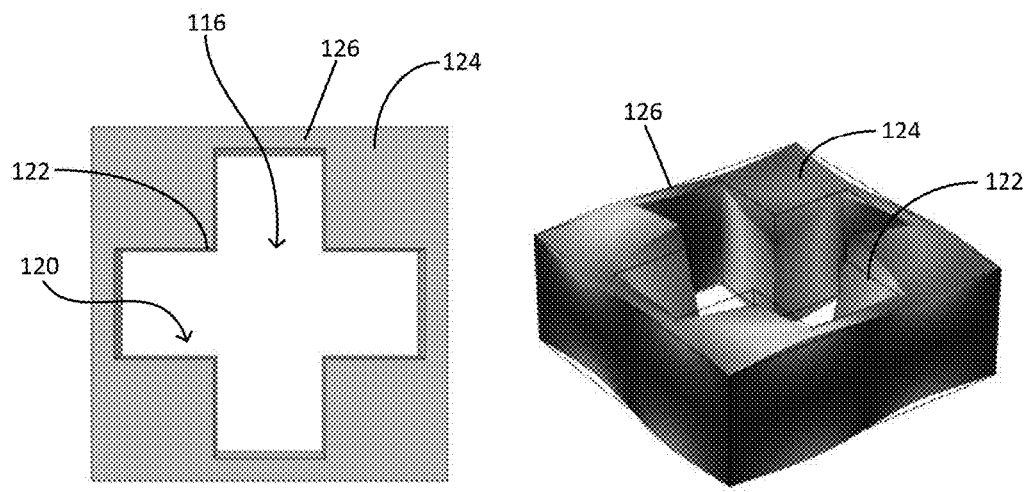
FIG. 23 shows a portion of a top view of unit cells and a perspective view of the unit cells in a membrane mode.
Figure 24:
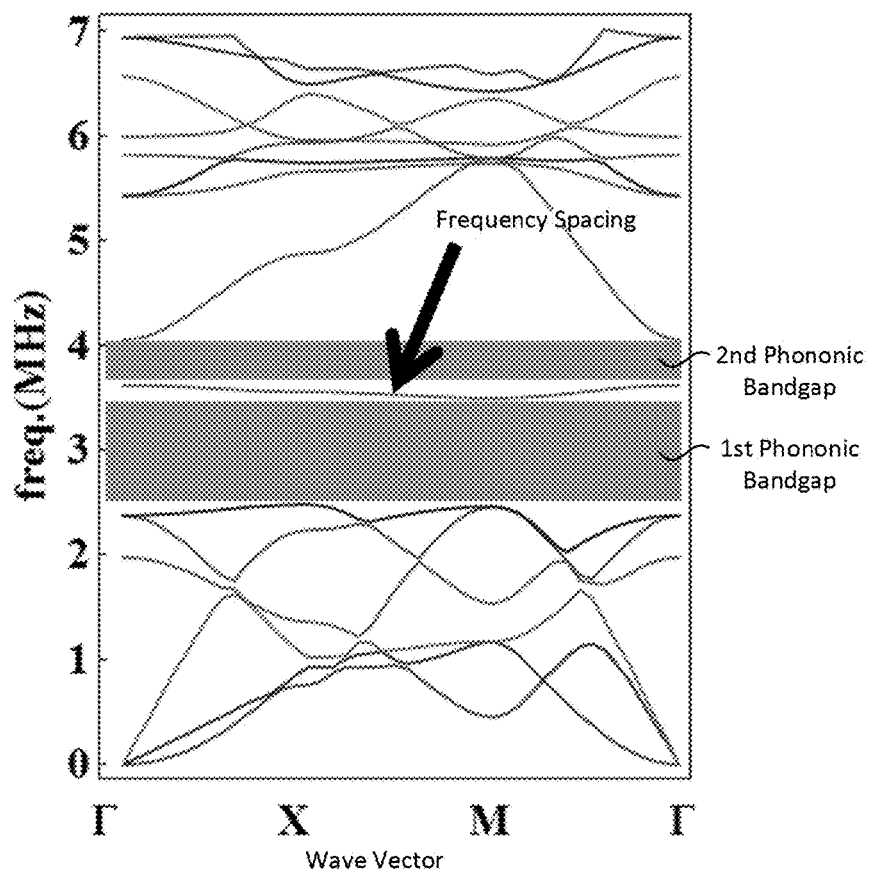
FIG. 24 shows a graph of frequency versus wave vector space for a phononic cystal that includes a plurality of the unit cells shown in FIG. 23.
Figure 25:
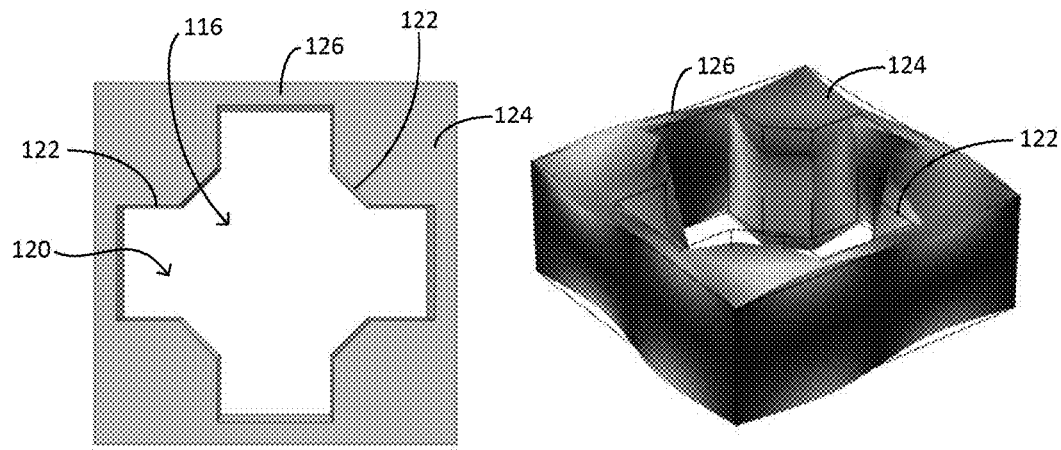
FIG. 25 shows a portion of a top view of unit cells and a perspective view of the unit cells in a membrane mode.
Figure 26:
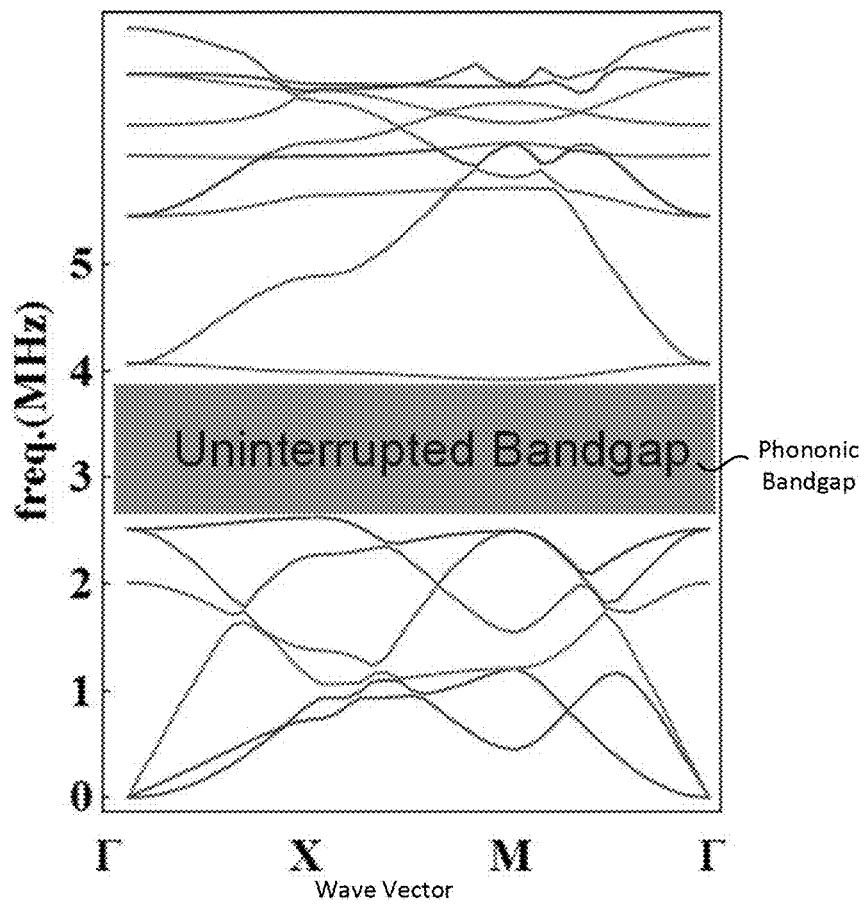
FIG. 26 shows a graph of frequency versus wave vector space for a phononic cystal that includes a plurality of the unit cells shown in FIG. 25.

Reticulated resonator 100 advantageously can have a selected acoustic isolation for communication of frequencies between membrane 102 and substrate frame 108. Membrane 102 advantageously can support the membrane mode. FIG. 21 shows a contour surface for displacement in a first membrane mode, e.g., membrane mode (1,1) of membrane 102. FIG. 22 shows a contour surface for displacement in a second membrane mode, e.g., membrane mode (2,2) of membrane 102. Beneficially, unit cells 114 and reticulation gaps 116 can be made with a selected shape to selectively tailor the phononic bandgap of photonic structure 106 such that the phononic bandgap can have a large frequency range or a small frequency range, a plurality of phononic bandgaps (see FIG. 24), a continuous (i.e., non-interrupted) phononic bandgap (see, e.g., FIG. 26), and the like. FIG. 23 shows a portion of a top view of unit cells 114 (unit members 124 having square edges) and a perspective view of unit cells 114 in a phononic mode having the phononic bandgap shown in FIG. 24 (a graph of phononic mode frequency versus wave vector space). FIG. 25 shows a portion of a top view of unit cells 114 (unit members 124 having chamfered edges) and a perspective view of unit cells 114 in a phononic mode having the phononic bandgap shown in FIG. 26 (a graph of phononic mode frequency versus wave vector space).

Surprisingly, phononic structure 106 controls acoustic coupling between membrane 102 and substrate frame 108. The phononic structure can retain membrane frame 104. Membrane 102 has a high quality factor (Q-factor) such as several millions at room temperature, and tens of millions at cryogenic temperatures and a frequency-quality factor (f-Q) product such as $10^{13}$ at room temperature and $10^{14}$ at cryogenic temperatures. A density and amplitude of non-membrane modes are greatly suppressed in the phononic bandgap, and membrane modes are shielded from an external mechanical drive by up to 120 dB, more specifically 30 dB.

The membrane frequency can be from 1 hertz (Hz) to 10 gigahertz (GHz), specifically from 1 kilohertz (kHz) to 10 megahertz (MHz), more specifically from 100 kHz to 5 MHz. The phononic bandgap of phononic structure 106 can be centered at frequencies greater than 0 Hz, with center frequency of the phononic bandgap falling in the range from 0 Hz to 10 GHz, and specifically from 1 kHz to 100 MHz, and more specifically from 100 kHz to 10 MHz The phononic bandgap can have a bandwidth from 0 Hz to 10 GHz specifically from 1 kHz to 10 MHz, and more specifically from 10 kHz to 1 MHz.

Reticulated resonator 100 has beneficial and advantageous uses. In an embodiment, a process for producing the membrane frequency includes providing reticulated resonator 100 that includes: substrate frame 108; phononic structure 106 including: first link 126 A connected to substrate frame 108; unit member 124 connected to first link 126A and in mechanical communication with substrate frame 108 through first link 126A; and second link 126B connected to unit member 124; membrane frame 104 connected to second link 126B and in mechanical communication with unit member 124 through second link 126B; and membrane 102 disposed on membrane frame 104 and in mechanical communication with substrate frame 108 through membrane frame 104 and unit member 124; subjecting membrane 102 to an excitation frequency; receiving, by membrane 102, the excitation frequency; and producing, by membrane 102, a membrane mode including the membrane frequency in response to receiving the excitation frequency. The membrane frequency can be at a frequency that is in the phononic bandgap of phononic structure 106.

Time and frequency standards can be based on a periodic event that repeats at a constant rate. A device to provide a time or frequency standard that produces this event is called a resonator. A resonator receives energy from an energy source to operate. Taken together, the energy source and resonator form an oscillator. The oscillator runs at a rate called a resonance frequency. In an embodiment, reticulated resonator 100 is combined with an electronic or optical energy source to form a stable oscillator for use as a frequency standard. Motion of membrane 102 interacts with the source to provide an electrical or optical response. Oscillation is sustained by taking an electrical or optical signal from reticulated resonator 100, amplifying it, and feeding it back to reticulated resonator 100. A rate of motional flexing of membrane 102 is a resonance frequency and selected by properties of reticulated resonator 100. The output frequency of reticulated resonator 100 can be either at a fundamental resonance or a multiple of the fundamental resonance, called an overtone frequency.

The articles and processes herein are illustrated further by the following Examples, which are non-limiting.

EXAMPLES

Example 1

Reticulated Resonator

We made a reticulated resonator that included a high-tension membrane inside of a silicon phononic crystal (PnC) structure that provided a shield for acoustic modes at megahertz frequencies. We probed the membrane modes and the non-membrane modes by measuring displacement spectra of the membrane and different components of the support structure. We found that inside the bandgaps, the density and the amplitude of the non-membrane modes were suppressed. In addition, the membrane modes, inside the bandgap, were shielded from an external mechanical drive by up to 30 dB.

Figure 27:
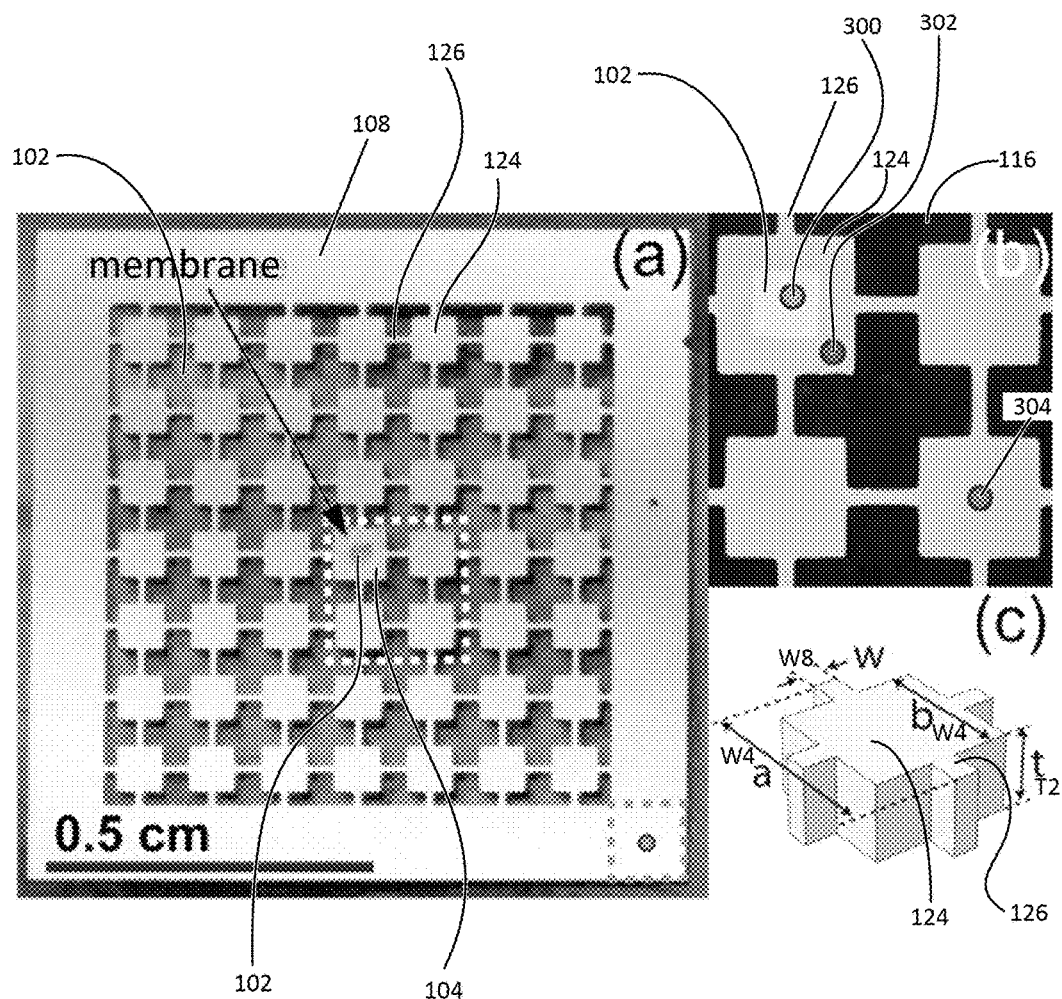
FIG. 27 shows a first reticulated resonator according to Example 1.

The device was fabricated to include a patterned silicon substrate with a center island that contains high-tension square film of $Si_3N_4$ suspended across an mm-scale membrane frame FIG. 27 (panel a). The unit cell length scale to create a bandgap centered at a frequency f~1 MHz was estimated by $\lambda/2=v/2f$~1 mm, where $\lambda$ and v are the acoustic wavelength and velocity in silicon, respectively. For bandgaps centered at megahertz frequencies, we fitted three to four unit cells along the direction between the membrane frame and chip frame with a 1 cm square chip. Our unit cell (see FIG. 27, panel c) was to form a repeating square block with four links in the reticulated resonator (as shown in FIG. 27, panels b) and a)). In FIG. 27, panel (a) shows a photograph of reticulated resonator (device A). The substrate frame (CF) is connected to a piezoelectric actuator at four corners (the blue dashed region). Panel (b) shows an expanded view of the white dashed regions that show a square membrane (M, yellow) surrounded by a membrane frame (MF, light blue) and a phononic crystal (PnC) unit cell (PnC, light blue). The red, green, and purple spots in panel (b) and the blue spot in panel (a) were locations of displacement measurements in FIG. 36, FIG. 37, FIG. 38, and FIG. 39. Panel (c) shows a schematic of the PnC unit cell and definitions of the geometry parameters.

Two different reticulated resonators (devices A and B) were studied that had different PnC shields. We also studied a comparative device (reference device C) that did not include a PnC shield. Table 1 lists measured geometry parameters for the reticulated resonators (A and B) and the comparative device C.

TABLE 1

| Parameter (μm) | Symbol | Device A (first reticulated resonator) | Device B (second reticulated resonator) | Device C (resonator) |
|---|---|---|---|---|
| Number of unit cells between center and edge of chip | | 3 | 4.5 | — |
| Unit cell size | a | 1100 μm | 800 μm | — |
| Block length | b | 686 | 542 | — |
| Bridge width | w | 97 | 96 | — |
| Wafer thickness | t | 300 | 300 | — |
| Membrane length | l | 372 | 367 | 500 |
| Membrane frame size | | 786 | 783 | $10^4$ |
| Membrane thickness | | 0.1 | 0.1 | 0.04 |

Figure 28:
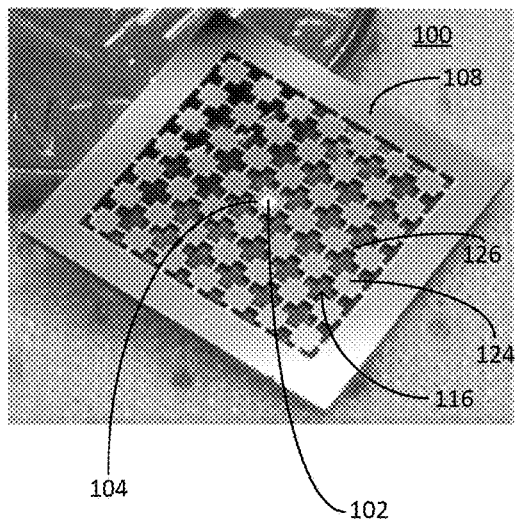
FIG. 28 shows another photograph of the first reticulated resonator shown in FIG. 27.
Figure 29:
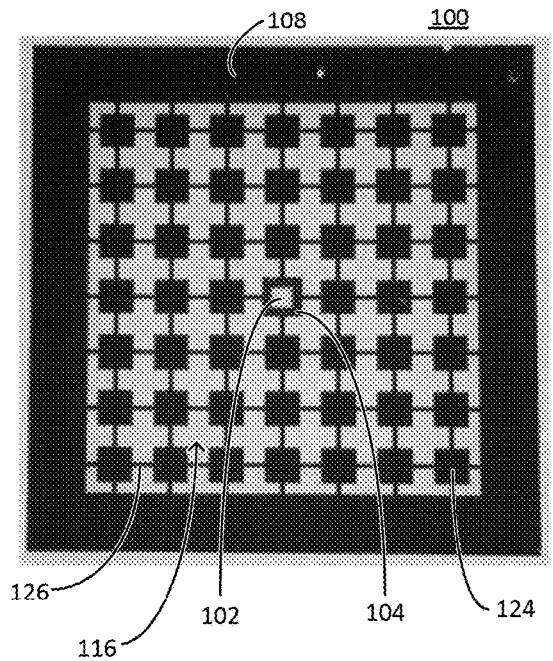
FIG. 29 shows a photograph of a top view of the first reticulated resonator shown in FIG. 28.
Figure 30:
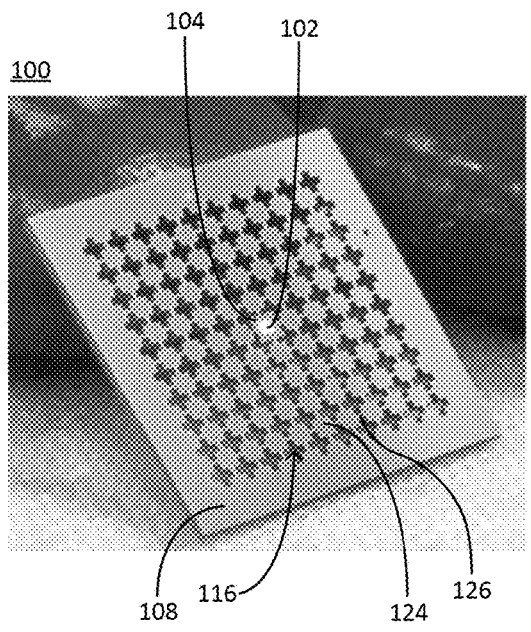
FIG. 30 shows a photograph of a second reticulated resonator.
Figure 31:
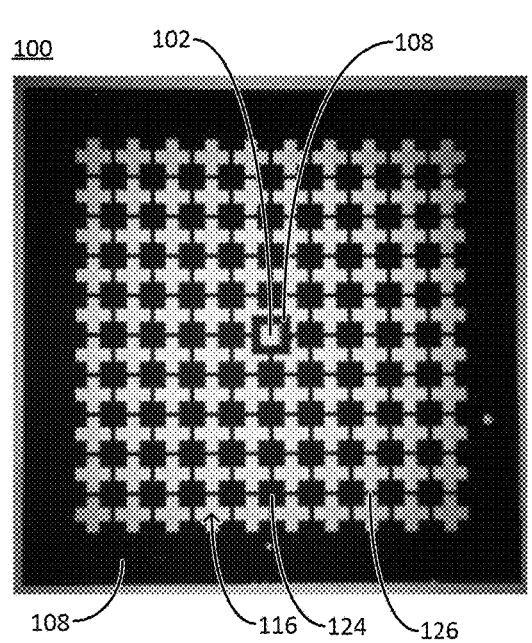
FIG. 31 shows a photograph of a top view of the second reticulated resonator shown in FIG. 30.
Figure 32:
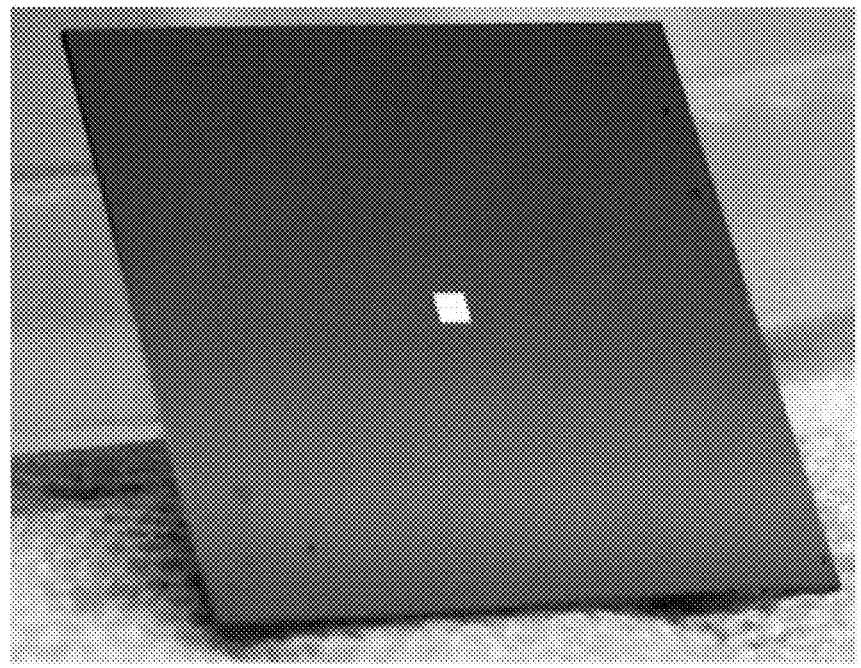
FIG. 32 shows a photograph of a resonator.
Figure 33:
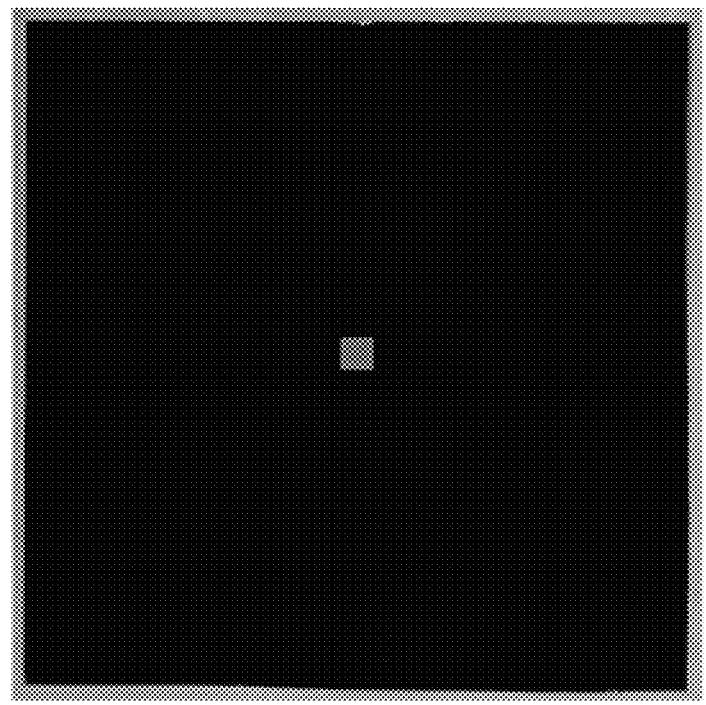
FIG. 33 shows a photograph of a top view of the resonator shown in FIG. 32.

FIG. 28 shows another photograph of the first reticulated resonator (also referred to as device A). FIG. 29 shows a photograph of a top view of the first reticulated resonator. FIG. 30 shows a photograph of the second reticulated resonator (also referred to as device B), and FIG. 31 shows a photograph of a top view of the second reticulated resonator. FIG. 32 shows a photograph of the resonator (also referred to as device C), and FIG. 33 shows a photograph of a top view of the resonator.

Figure 34:
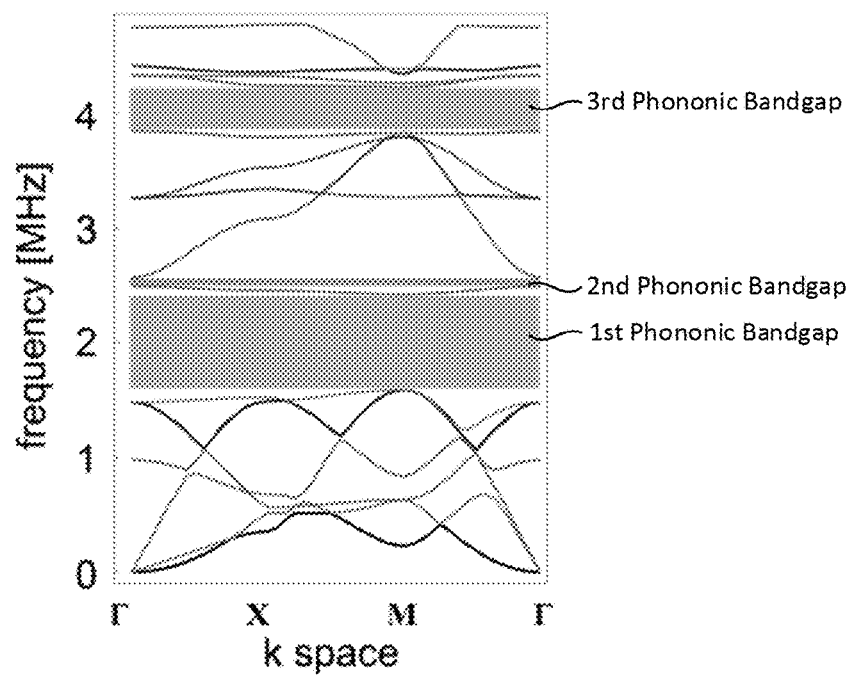
FIG. 34 shows a graph of frequency versus wave vector space for a simulation of the first reticulated resonator.
Figure 35:
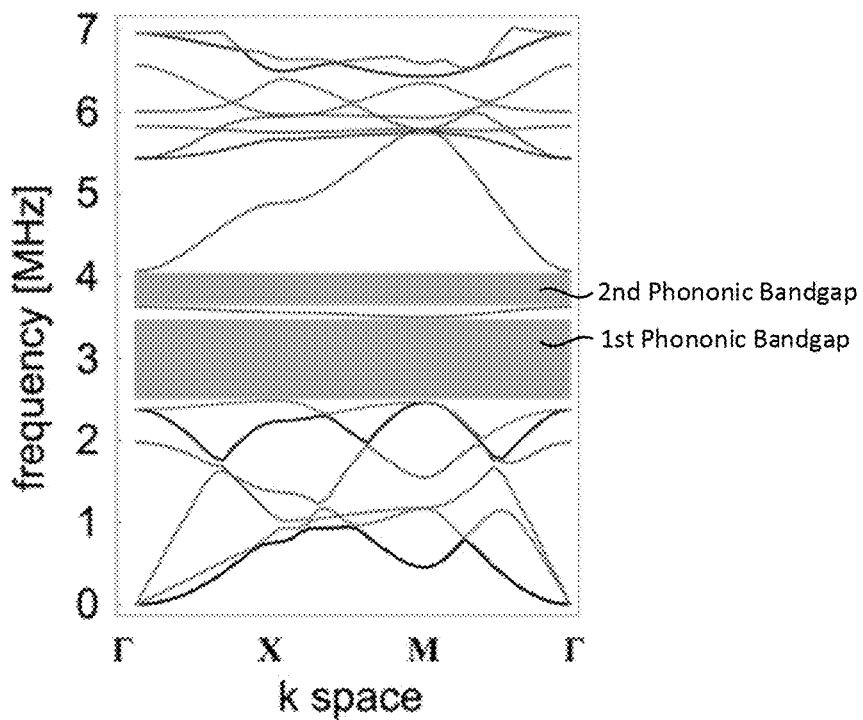
FIG. 35 shows a graph of frequency versus wave vector space for a simulation of the second reticulated resonator.

FIG. 34 and FIG. 35 show simulated band diagrams for the two different PnCs with infinite number of unit cells. The calculations were completed with the finite-element-method (FEM) software COMSOL using the measured device parameters of device A and device B.

Example 2

Making Eticulated Resonator

Reticulated resonators device A and device B of Example 1 were made by growing a 100-nm-thick $Si_3N_4$ film by low-pressure chemical vapor deposition on both sides of a 300-μm thick Si wafer. The membrane and PnC structure were created in two sequential steps; each started with patterned removal of the back $Si_3N_4$ layer followed by deep reactive-ion etching (DRIE) for bulk Si machining. In the first step, the DRIE stopped tens of micrometers short of etching fully through the wafer, and a KOH wet etch completed the release of the square $Si_3N_4$ membrane on the front of the wafer. In the second step, the PnC crosses were micromachined with DRIE all the way through the wafer (resulting in PnC holes that are vertical to ~1°). During fabrication (except the KOH step), the front side of the wafer was glued with processing adhesive to a protection substrate, and the final devices were released from the protection substrate and cleaned using solvents and a sulfuric-acid-based solution.

The membrane resonator vibrates like a drum with discrete frequencies given by $f_{mn}=[\sigma(m^2+n^2)/4\rho l^2]^{1/2}$, where $\sigma$ is the tensile stress, (m, n) are integer mode indices representing the number of antinodes, $\rho$ is the volume mass density, and l is the membrane side length. The fabricated membranes in the PnCs were experimentally confirmed to be under a high tensile stress of 1 GPa. The fundamental membrane frequency for devices A and B was 1.1 MHz.

To characterize the mechanical properties of the devices, we excited the chip at different frequencies through a piezoelectric ring actuator connected to all four frame corners with double-sided tape and measured displacement using a Mach-Zehnder interferometer. First, we present studies in which we probed the displacement of the $Si_3N_4$ membrane. We positioned the optical spot slightly off the membrane center to allow a variety of modes to be probed. The driven displacements as a function of frequency for devices A and B were compared with that of a control device C in FIG. 36 and FIG. 37, respectively. We found that the displacement was clearly suppressed in the frequency ranges of 1.5-2.75 MHz and 4.05-4.45 MHz (2.65-3.25 MHz and 3.5-4.5 MHz) for device A (B), resulting in a flat response that was limited by the shot noise of optical detection. These "observed bandgaps" roughly overlapped with the calculated bandgaps [grey regions in both FIG. 34, FIG. 35, FIG. 36, and FIG. 37. The center frequencies of the observed and predicted bandgaps were consistent within ~10%.

Figure 36:
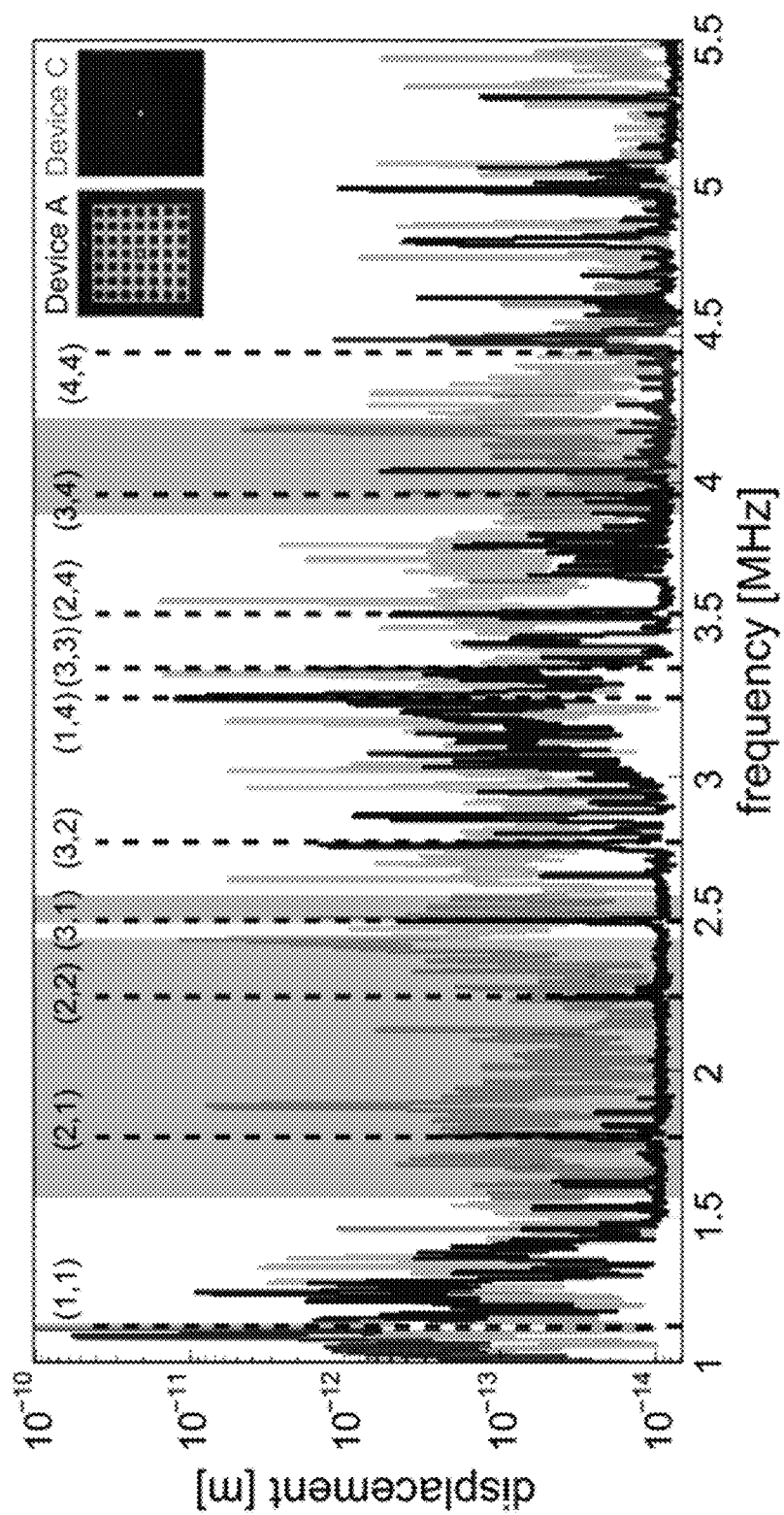
FIG. 36 shows a graph of displacement versus frequency for the first reticulated resonator and the resonator.
Figure 37:
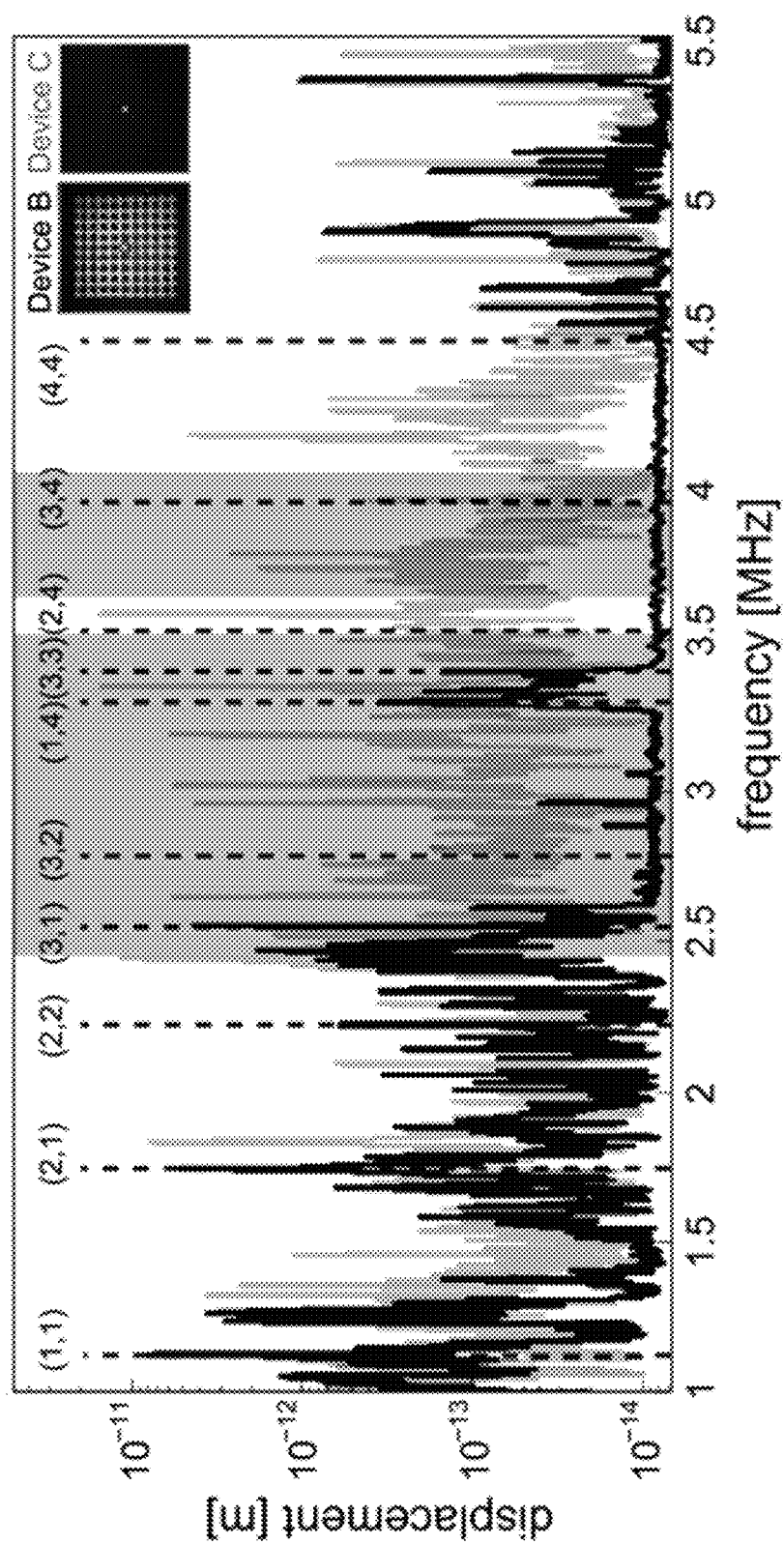
FIG. 37 shows a graph of displacement versus frequency for the second reticulated resonator and the resonator.

Most of the modes shown in FIG. 36 and FIG. 37 are non-membrane modes; the finite number of membrane modes was shown by dashed lines. Physically, the chip consisted of (1) the membrane (M), (2) the membrane frame (MF), (3) the PnC structure (PnC), and (4) the chip frame (CF) [FIG. 27, panels a) and b)]. The membrane and the MF together formed a "defect" embedded in the PnC lattice. We optically probed the MF, the PnC, and the CF by focusing on the three different locations indicated in FIG. 27, panels a) and b). Looking at these spectra in conjunction with the membrane displacement, we could understand the origin of the non-membrane modes. The piezoelectric actuator itself had frequency-dependent structure, and measuring at the CF revealed the information about this structure. Mainly, the displacement measured on the corner of CF was limited by the detection noise, but some "piezo-modes" were clearly identifiable [see FIG. 38 and FIG. 39 for two examples].

We found that the combined spectra have distinct features inside and outside the observed bandgaps. Inside the observed bandgap, the spectra of the PnC, the MF, and the membrane were flat except a couple of "defect modes" observed in the spectra of the MF and the membrane [see FIG. 38 for one example]. While the mechanical modes of the MF could not be completely avoided in the bandgap, they only occurred sparsely and were clearly separable from the membrane modes. Outside the observed bandgaps, most modes except the membrane modes had comparable motion in the membrane, the MF, and the PnC [see FIG. 39 for one example]. We also found that piezo modes greatly enhanced the motion of other components, while inside the observed bandgaps the piezo modes did not induce any observed motion of other components [compare FIG. 38 and FIG. 39].

Figure 38:
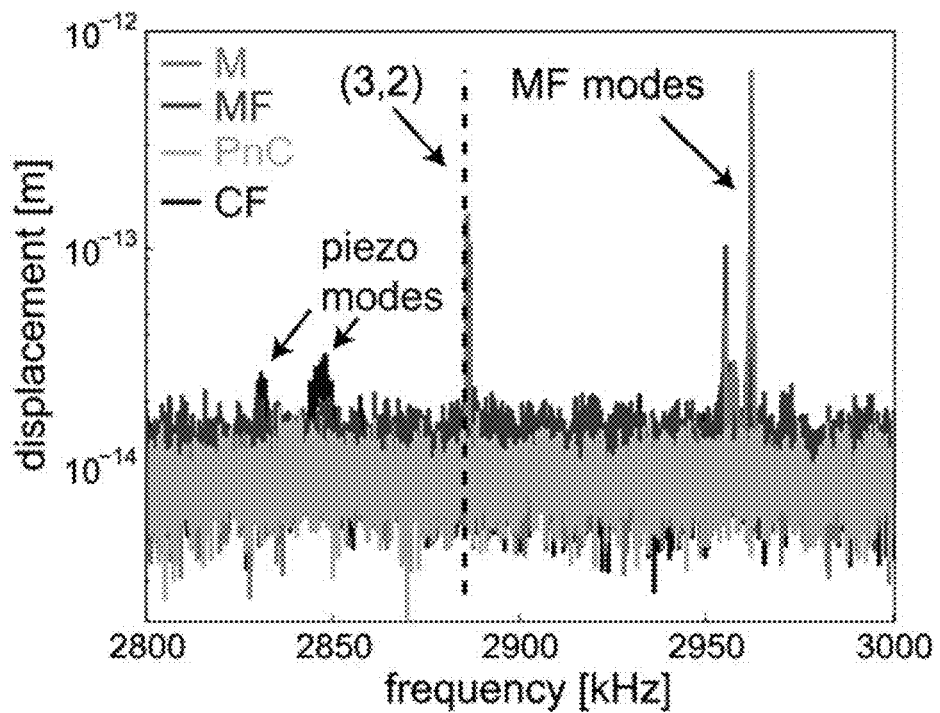
FIG. 38 shows a graph of displacement versus frequency for the second reticulated resonator in the band gap of the phononic structure.
Figure 39:
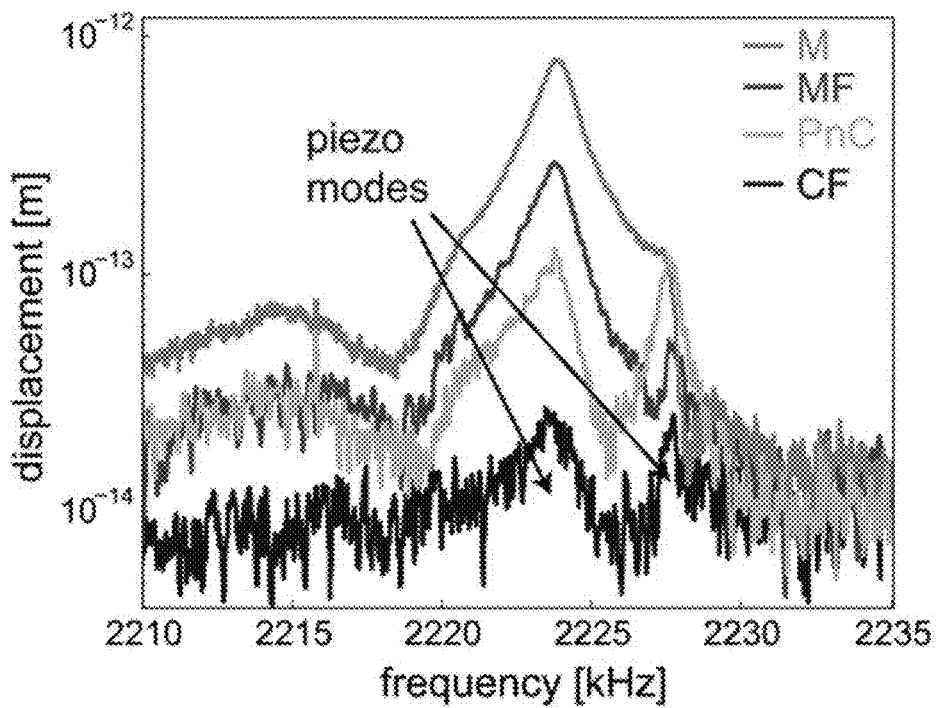
FIG. 39 shows a graph of displacement versus frequency for the second reticulated resonator outside the bandgap of the phononic structure.

With reference to FIG. 34 FIG. 39, measured membrane displacement spectra of devices A, B, and C are shown in FIG. 36-FIG. 37. The data were smoothed with a 4 kHz bandwidth. The ranges of ideal bandgaps are shown in grey. Membrane modes were predicted based on observed fundamental mode frequencies of devices A and B (up to the (4,4) mode) and were shown by dashed lines. In FIG. 38 and FIG. 39, measurements of displacement spectra for device B were made at the membrane frame (MF, green), the PnC (purple), and the corner of substrate frame (CF, blue), and FIG. 38 shows an example spectral region in an observed bandgap. FIG. 39 shows an example of two non-membrane modes outside the observed bandgaps.

The observed eigenmodes included admixtures of modes created by the membrane, the MF, the PnC, and the CF. We used an FEM to simulate the whole device in order to visualize and characterize the expected frequency-dependent structure of all the modes. The boundary conditions for the simulation fixed the corners of the back side of the chip. We found all the eigenmodes between 1 and 5 MHz. To estimate the motion that would be observed on the $Si_3N_4$ membrane [as measured in FIG. 36 and FIG. 37], for each mode we calculated a "partition coefficient" defined by the ratio of the energy stored in the membrane to the energy stored in the whole device $$E_{mem} = [\int_{mem} \rho(x)|u(x)|^2 d^3x]/[\int_{whole} \rho(x)|u(x)|^2 d^3x]$$

where u(x) is the simulated displacement field and ρ(x) is the mass density field.

Figure 40:
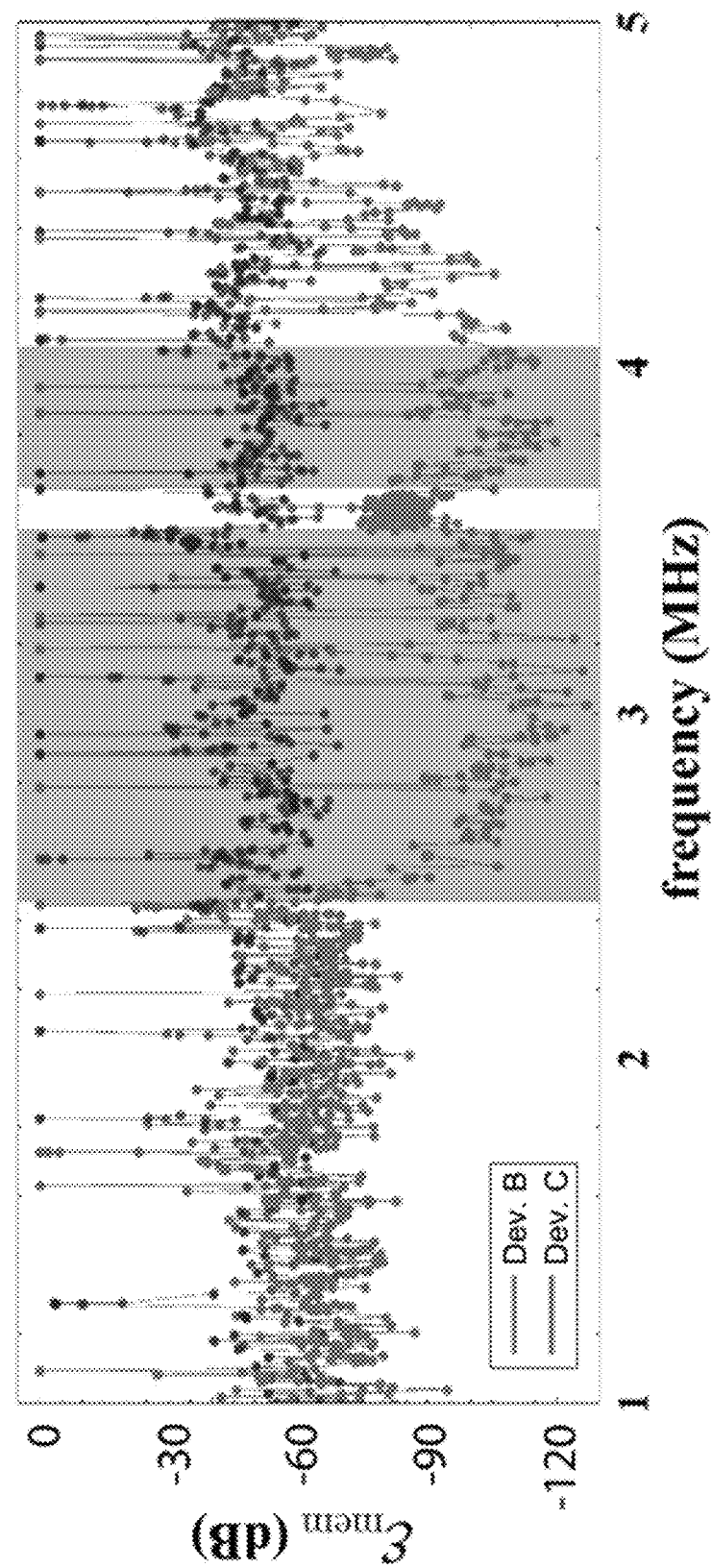
FIG. 40 shows a graph of a value of a partition function versus frequency for the second reticulated resonator and the resonator.

The partition coefficient $E_{mem}$ is plotted in FIG. 40 as a function of mode frequency using the parameters for devices B and C. The membrane modes were clearly identifiable as the $E_{mem} \simeq 0$ dB; these modes had the small effective mass associated with the $Si_3N_4$ membrane. A majority of the non-membrane modes of device C had an $E_{mem}$ between −40 and −60 dB; these modes had a much larger effective mass associated with the silicon substrate. For device B, there were two ranges with reduced $E_{mem}$ that roughly overlapped with the ideal calculated bandgaps. The reductions were finite ($E_{mem}$ between −70 and −130 dB) and smoothly degraded because the simulation took into account the finite number of unit cells. There were also a finite number of non-membrane modes with $E_{mem} < -40$ dB. Inside the device-B bandgap, these modes could be classified as defect modes with $E_{mem} < -30$ dB. Outside of the device-B bandgap and in device C, there were a larger number of modes (~4% of the modes) with $E_{mem} < -40$ dB. These modes with the largest $E_{mem}$ tend to be clustered near the expected membrane mode frequencies.

Figure 41:
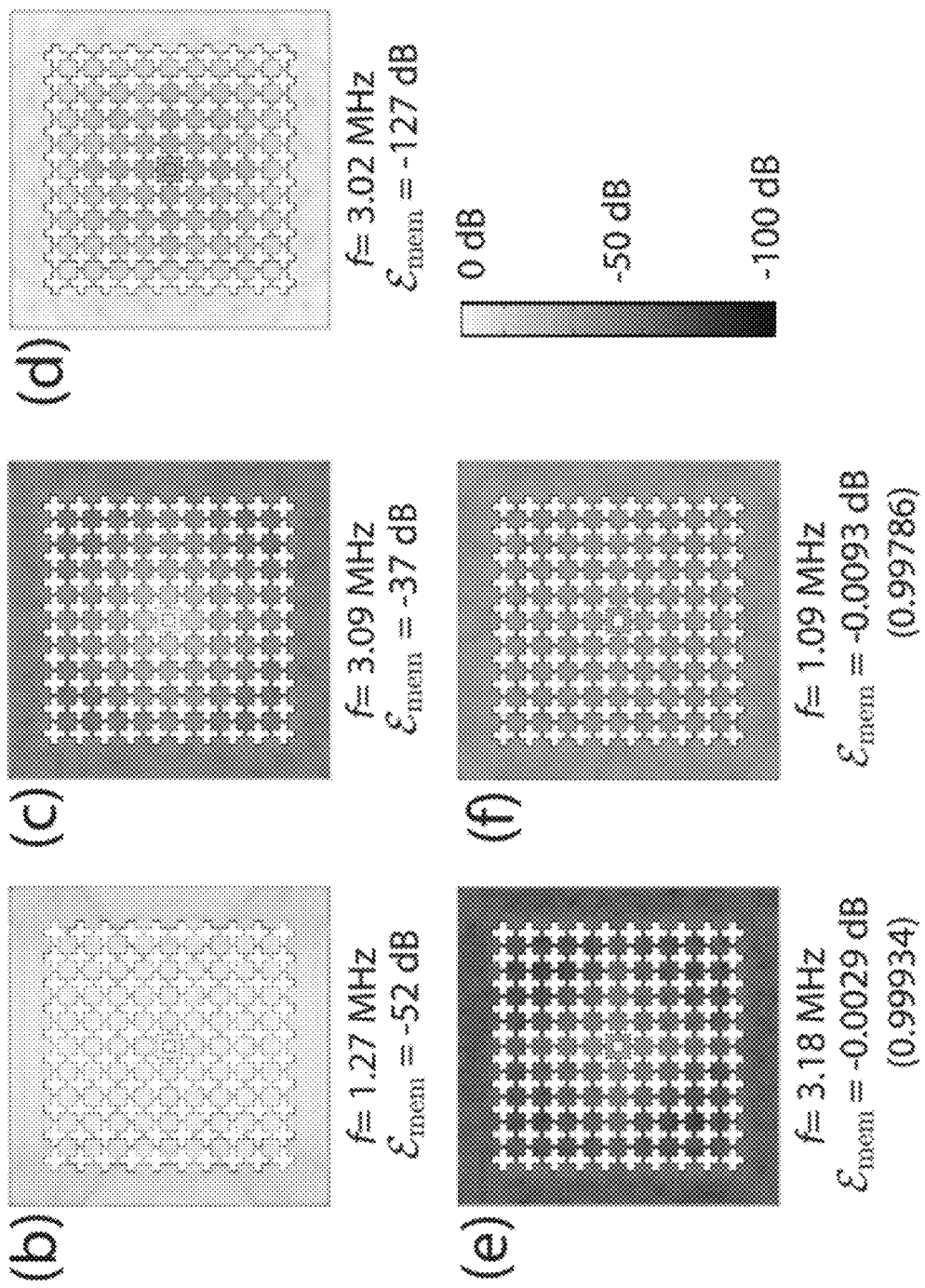
FIG. 41 shows a color map of displacement amplitude superimposed on the second reticulated resonator at various frequencies for the data shown in FIG. 37.

In FIG. 41 (panels b-f; note "panel a" is not shown in FIG. 41), we also showed the displacement profile of example modes on a logarithmic scale. We saw that the non-membrane modes inside the bandgaps are dominated by the MF or the CF, and the displacement field decayed exponentially in the PnC [FIG. 41, panels c and d]. On the contrary, the non-membrane modes outside the bandgaps had a uniformly distributed displacement field [FIG. 41, panel b]. We also found that for the membrane modes inside and outside the bandgaps [FIG. 41, panels e and f], the displacement fields in the PnC behaved the same as the non-membrane modes inside and outside the bandgaps. In other words, inside the bandgap, the PnC acted as a passive mechanical filter that decouples the CF and the "defect;" outside the bandgap, the PnC moved with all the other components together, i.e., they can be strongly coupled.

With regard to FIG. 40 and FIG. 41, simulated membrane and non-membrane modes for devices B and C were reported. FIG. 40 shows simulated partition coefficient $E_{mem}$ of devices B and C. Data of device B (C) are red (blue). Data of each device were connected by lines to see the trend. Ideal calculated bandgaps are shown in grey. FIG. 41 shows simulated displacement field for four kinds of modes. Color maps represent the amplitude of displacement in a logarithmic scale. Panel (b) shows an example of a non-membrane mode outside the bandgap. Panel (c) shows an example of a MF mode inside the bandgap. Panel (d) shows an example of a substrate frame (CF) mode inside the bandgap. Panels (e) and (f) provide two examples of membrane modes inside/outside the bandgap.

Finally, we have studied the efficiency with which the piezoelectric actuator can drive membrane modes inside and outside the bandgap. The piezoelectric actuator did not directly drive the membrane; it drove the membrane through the chip frame, the PnC, and the membrane frame. In other words, the piezoelectric actuator actuated the membrane mode through the non-membrane modes, and hence, we expected the driving efficiency to be low inside the observed bandgap. We quantitatively analyzed this effect by measuring the piezo actuated energy of the (1,1) through (4,4) membrane modes of devices A and C. To obtain a calibrated measure of the relative actuated energy, we also measured for each mode the thermally actuated energy provided by the thermal fluctuating force, which was not shielded by the PnC. The ratio of the driven to thermal energy, R, was obtained by comparing the driven to thermal vibration amplitude $$R = R(p,f,B_w) \propto |D(p,f)/\eta|^2/[B_w S_d(f)/\eta^2] = |D(p,f)|^2/[B_w S_d(f)] \qquad (2)$$

where D(p,f) was the driven displacement amplitude measured with a network analyzer under external driving power p, $S_d(f)$ was the displacement spectral density measured with a spectrum analyzer without external driving power, η was the overlap factor between the optical spot and the membrane mode shape, and $B_w = 2$ Hz was the resolution bandwidth of the spectrum analyzer.

Figure 42:
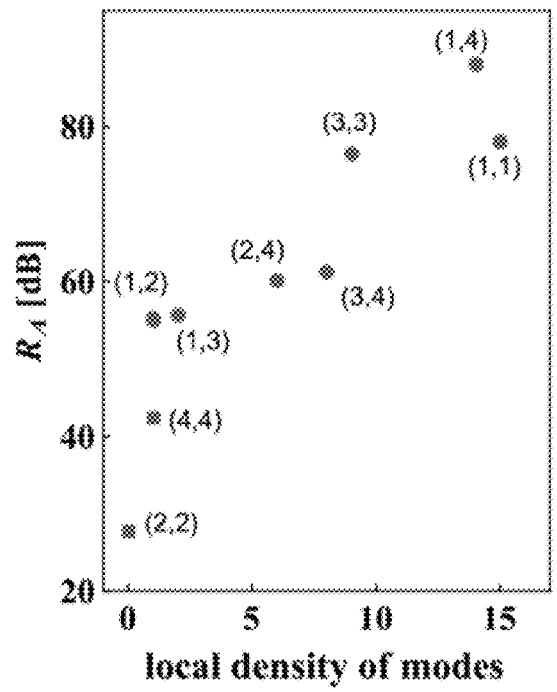
FIG. 42 shows a graph of a ratio of actuated energy of membrane modes provided by a piezoelectric actuator to that by a thermal fluctuating force versus a local density of membrane modes for the first reticulated resonator.
Figure 43:
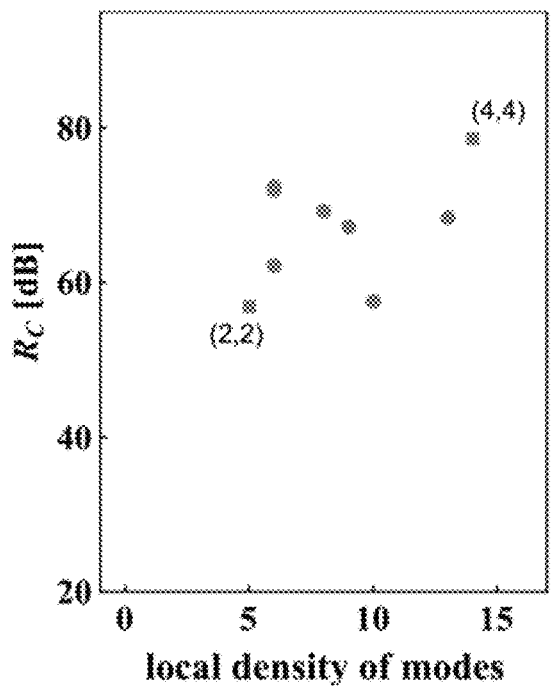
FIG. 43 shows a graph of a ratio of actuated energy of membrane modes provided by a piezoelectric actuator to that by a thermal fluctuating force versus a local density of membrane modes for the resonator.

In FIG. 42 and FIG. 43, we plotted R as a function of a measure that approximated the local mode density near each membrane mode. This measure provided an estimate of the expected driving efficiency, but not necessarily a rigorous correspondence, because the set of optically measured modes would not necessarily correspond to the set of modes that couple best to a particular membrane mode. Nonetheless, we saw a positive correlation between the driven motion and this mode density for device A. We also observed a much larger dynamic range in R for device A than for device C, which was as expected because the phononic crystal structure introduced a nonuniformity to the local mode structure. A direct comparison between devices A and C showed the smallest R in device A was 30 dB smaller than the smallest R in device C, indicating that in the bandgap membrane modes could be significantly isolated from the chip frame.

With regard to FIG. 42 and FIG. 43, the ratio of the actuated energy of the membrane modes provided by the piezoelectric actuator to that by the thermal fluctuating force as a function of a local density of modes were shown. The density was determined from the data by counting the number of observed modes in a 50 kHz range centered at each membrane mode. FIG. 42 shows data for device A. The membrane mode indices are labeled. FIG. 43 shows data for device C. The corresponding modes with lowest R in (a) are shown in square.

Delivering energy from the chip frame to the membrane is the reverse process of radiating energy from the membrane to the chip frame. Therefore, the well-isolated (small R) membrane modes were expected to have small radiation loss. However, the highest Q of the membrane modes we observed in device A was about $10^6$, comparable with the highest Q of the membrane modes in device C. This was possibly because the membranes were still limited by the material loss. In fact, in this new fabrication process, we knew that some defects were generated; images of some of the membranes revealed inhomogeneous spots up to 100 μm in size. In the future, we will investigate realizing higher $Si_3N_4$ Qs in the bandgaps by measuring at cryogenic temperature and improving control of the fabrication.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A reticulated resonator comprising:
    a reticulated substrate comprising:
        a substrate frame; and
        a phononic structure in mechanical communication with the substrate frame and comprising a plurality of unit cells arranged in a two dimensional array such that adjacent unit cells form a membrane frame;
        an aperture disposed between adjacent unit cells and bounded by walls of the adjacent unit cells; and
        a plurality of reticulation gaps interposed between neighboring unit cells;
    a membrane disposed on the membrane frame of the phononic structure and covering the aperture so that the membrane is directly exposed to the aperture; and
    a phononic bandgap such that the unit cells of the phononic structure do not communicate phonons between the membrane and the substrate frame and blocks communication of frequencies between the membrane frame and the membrane.

2. The reticulated resonator of claim 1, further comprising a secondary membrane disposed on the reticulated substrate,
    wherein the membrane comprises a first membrane frequency and a first membrane mode, and
    the secondary membrane comprises a second membrane frequency and a second membrane mode.

3. The reticulated resonator of claim 1, wherein the unit cell comprises:
    a unit member; and
    a link to connect the unit member to the substrate frame.

4. The reticulated resonator of claim 3, wherein the two-dimensional array of the unit cells is disposed in a periodic arrangement in the phononic structure.

5. The reticulated resonator of claim 4, wherein the periodic arrangement comprises a square array of unit cells, concentric circular array of unit cells, or a combination comprising at least one of the foregoing.

6. The reticulated resonator of claim 3, wherein neighboring unit members are spaced apart by a reticulation gap bounded by the link and the unit member.

7. The reticulated resonator of claim 6, wherein unit cells connect the membrane frame to the substrate frame.

8. The reticulated resonator of claim 7, wherein links connect the membrane to the substrate frame.

9. The reticulated resonator of claim 1, wherein the membrane frame and the membrane are centrally disposed among the plurality of unit cells.

10. The reticulated resonator of claim 7, wherein the membrane and the unit cells comprise a different composition.

11. The reticulated resonator of claim 7, wherein the membrane comprises a membrane mode that comprises a membrane frequency in a phononic bandgap of the phononic structure.

12. The reticulated resonator of claim 7, wherein a thickness of the membrane is less than a thickness of the unit member.

13. A reticulated resonator comprising:
a substrate frame;
a phononic structure comprising:
a first link connected to the substrate frame;
a plurality of unit members connected to the substrate frame through the first link and in mechanical communication with the substrate frame through the first link, the unit members arranged in a two-dimensional array; and
a second link connected to the unit member;
a membrane frame connected to the second link and in mechanical communication with the unit members through the second link; and
a plurality of reticulation gaps interposed between neighboring unit cells; and
a membrane disposed on the membrane frame and in mechanical communication with the substrate frame through the membrane frame and the unit members so membrane covers an aperture bounded by walls of the membrane frame so that the membrane is directly exposed to the aperture; and
a phononic bandgap such that the phononic structure does not communicate phonons between the membrane and the substrate frame and blocks communication of frequencies between the membrane frame and the membrane.

14. The reticulated resonator of claim 13, further comprising a source to produce an excitation frequency,
wherein the membrane receives the excitation frequency from the source.

15. The reticulated resonator of claim 14, wherein the membrane is configured to produce a membrane mode in response to receiving the excitation frequency, and
the membrane mode comprises a membrane frequency that is in a phononic bandgap of the phononic structure.

16. A process for producing a membrane frequency, the process comprising:
providing a reticulated resonator comprising:
a substrate frame;
a phononic structure comprising:
a first link connected to the substrate frame;
a plurality of unit members connected to the substrate frame through the first link and in mechanical communication with the substrate frame through the first link;
a second link connected to the unit members; and
a plurality of reticulation gaps interposed between neighboring unit cells;
a membrane frame connected to the second link and in mechanical communication with the unit members through the second link;
a membrane disposed on the membrane frame and in mechanical communication with the substrate frame through the membrane frame and the unit members so that membrane covers an aperture bounded by walls of the membrane frame so that the membrane is directly exposed to the aperture; and
a phononic bandgap such that the phononic structure does not communicate phonons between the membrane and the substrate frame and blocks communication of frequencies between the membrane frame and the membrane;
subjecting the membrane to an excitation frequency;
receiving, by the membrane, the excitation frequency;
producing, by the membrane, a membrane mode comprising a membrane frequency in response to receiving the excitation frequency and
blocking, by the phononic structure, communication of frequencies between the membrane frame and the membrane.

17. The reticulated resonator of claim 16, wherein the membrane frequency is in the phononic bandgap of the phononic structure.

* * * * *